(12) United States Patent
Ohhira

(10) Patent No.: US 7,046,414 B2
(45) Date of Patent: May 16, 2006

(54) OPTICAL MODULATION SYSTEM APPLYING A HIGHLY STABLE BIAS VOLTAGE TO AN OPTICAL MODULATOR

(75) Inventor: Risato Ohhira, Tokyo (JP)

(73) Assignee: NEC Corporation, Tokyo (JP)

( * ) Notice: Subject to any disclaimer, the term of this patent is extended or adjusted under 35 U.S.C. 154(b) by 71 days.

(21) Appl. No.: 10/318,016

(22) Filed: Dec. 13, 2002

(65) Prior Publication Data

US 2003/0123121 A1 Jul. 3, 2003

(30) Foreign Application Priority Data

Dec. 13, 2001 (JP) .......................... 2001-380375

(51) Int. Cl.
*G02F 1/01* (2006.01)

(52) U.S. Cl. .................. 359/238; 359/237; 359/276; 359/278

(58) Field of Classification Search ............... 359/238, 359/237, 276, 278, 284, 287, 289, 182, 183, 359/290, 291
See application file for complete search history.

(56) References Cited

U.S. PATENT DOCUMENTS

| | | | | |
|---|---|---|---|---|
| 5,359,449 A | * | 10/1994 | Nishimoto et al. | 398/198 |
| 5,963,352 A | * | 10/1999 | Atlas et al. | 398/193 |
| 6,583,917 B1 | * | 6/2003 | Melloni et al. | 359/245 |

| | | | | |
|---|---|---|---|---|
| 2002/0003648 A1 | * | 1/2002 | Kobayashi et al. | 359/180 |

FOREIGN PATENT DOCUMENTS

| | | |
|---|---|---|
| EP | 1 004 920 | 5/2000 |
| EP | 1 004 920 A3 | 12/2000 |
| JP | A5-100194 | 4/1993 |
| JP | A5-142504 | 6/1993 |
| JP | A5-224163 | 9/1993 |
| JP | 8-248366 | 9/1996 |
| JP | A8-248366 | 9/1996 |
| JP | 10-48582 | 2/1998 |
| JP | 10-246874 | 9/1998 |
| JP | A2000-162563 | 6/2000 |

OTHER PUBLICATIONS

Aisawa et al., "DC Drift Compensation of LiNbO$_3$ Intensity Modular Using Low Frequency Perturbation", IEICE Transactions On Communications, vol. E81–B, No. 1, 1998, XP–000777759, pp. 107–109.

* cited by examiner

*Primary Examiner*—Ricky Mack
*Assistant Examiner*—Brandi Thomas
(74) *Attorney, Agent, or Firm*—Young & Thompson

(57) ABSTRACT

An optical modulator is driven by applying, to a first signal electrode, an amplitude-modulated input driving signal waveform, which has a pair of same phase envelope lines, and which has a full width smaller than a potential difference between adjacent two of bias voltages at which an optical intensity of an intensity-modulated output optical signal from the optical modulator takes a minimum value or between adjacent two of other bias voltages at which the optical intensity takes a maximum value.

40 Claims, 11 Drawing Sheets intensity-modulated output optical signal waveform intensity-modulated output optical signal waveform intensity-modulated output optical signal waveform intensity-modulated output optical signal waveform intensity-modulated output optical signal waveform

OPTICAL MODULATION SYSTEM APPLYING A HIGHLY STABLE BIAS VOLTAGE TO AN OPTICAL MODULATOR

BACKGROUND OF THE INVENTION

1. Field of the Invention

The present invention relates to an optical modulation system including an optical modulator, and more particularly to an optical modulation system capable of keeping a highly stable bias voltage applied to an optical modulator for performing a light intensity modulation.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

For realizing an optical communication using an optical fiber, a modulation in intensity of light based on data signals has generally been made. This light intensity modulation is to vary the light intensity, for example, light-on and light-off, over times. In order to obtain a higher transmission rate of not less than 10 GHz in bit rate, an external modulator has been used. Typical examples of the external modulator may be a Mach-Zehnder optical modulator or an electric field absorption optical modulator (EA-modulator), which exhibits a small chirping in the light intensity modulation. The chirping is a variation in frequency of the light due to another variation in intensity of the light. The small chirping is preferable for realizing the optical communication. For a long-distance optical communication, the Mach-Zehnder optical modulator is useful. Notwithstanding, it is disadvantageous that the Mach-Zehnder optical modulator allows a undesired variation in bias voltage from an intended or set voltage level due to any factors such as temperature variation, long-term field application and time-passing. The undesired variation in bias voltage causes variation in transmission characteristics over times.

Japanese laid-open patent publication No. 2000-162563 discloses a method for obtaining a desired stability in bias voltage, wherein a low frequency signal is superimposed over an electric driving signal to detect an amount and a direction of the variation of operating-point, for the purpose of feed-back control of the bias voltage based on the detected amount and direction.

FIG. 1 is a diagram illustrative of a structure of a conventional optical modulation system including a Mach-Zehnder optical modulator. Upon receipt of an input of an electrical signal 7 into a driver amplifier 55, the driver amplifier 55 output first and second electric driving signals 7A and 7B which are complementary to each other. The first electric driving signal 7A is supplied to a first signal electrode 51A of a Mach-Zehnder optical modulator 51. The second electric driving signal 7B is supplied to a second signal electrode 51B of the Mach-Zehnder optical modulator 51. A low frequency oscillator 4 supplies a low frequency signal to a low frequency superimposing circuit 54. A bias supply circuit 53 also supplies a bias voltage to the low frequency superimposing circuit 54. The low frequency superimposing circuit 54 superimposes the low frequency signal to the bias voltage, and supplies a superimposed bias voltage to the first signal electrode 51A of the Mach-Zehnder optical modulator 51. The superimposed bias voltage is a bias voltage superimposed with the low frequency signal.

A light source 1 emits a continuous wave light which is inputted into the Mach-Zehnder optical modulator 51. The light source 1 may typically comprise a photo-diode which emits a continuous wave light. The Mach-Zehnder optical modulator 51 performs a light intensity modulation of the inputted continuous wave light based on the first and second electric signals 7A and 7B as applied to the first and second signal electrodes 51A and 51B with the superimposed bias voltage. The Mach-Zehnder optical modulator 51 supplies an intensity-modulated light signal to an optical branch circuit 2. The optical branch circuit 2 divides the intensity-modulated light signal into a first intensity-modulated light signal 2A as a transmission signal and a second intensity-modulated light signal 2B as a feed-back signal.

The second intensity-modulated light signal 2B as a feed-back signal is supplied to a photoelectric converter 3 and converted into an electric feed-back signal by the photoelectric converter 3. The photoelectric converter 3 may typically comprise a photo-diode. The electric feed-back signal is supplied to an amplifier 5. The amplifier 5 supplies an amplified electric feed-back signal to a phase comparator 6. The low frequency oscillator 4 also supplies the low frequency signal to the phase comparator 6. The phase comparator 6 performs a synchronous detection by comparing the low frequency signal to the electric feed-back signal. The phase comparator 6 supplies a synchronously detected signal to a low pass filter 52. The low pass filter 52 extracts a direct current voltage error signal and supplies the direct current voltage error signal to the bias supply circuit 53. The bias supply circuit 53 generates a bias voltage based on the direct current voltage error signal and supplies the bias voltage to the low frequency superimposing circuit 54. The low frequency superimposing circuit 54 superimposes the low frequency signal to the bias voltage, and supplies a bias voltage superimposed with the low frequency signal to the first signal electrode 51A of the Mach-Zehnder optical modulator 51.

FIG. 2 is a view illustrative of a relationship of an extinction characteristic of the conventional optical modulation system with reference to electric driving signals amplitude-modulated by a low frequency signal superimposed to the bias voltage. The extinction characteristic is represented by a variation in light intensity over the applied voltage amplitude-modulated with the low frequency signal. Namely, the extinction characteristic means the dependency of the output light intensity upon the applied voltage level. As described above, the bias voltage superimposed with the low frequency signal is supplied to the first signal electrode 51A of the Mach-Zehnder optical modulator 51. The low frequency signal modulates the amplitudes of the complementary first and second electric driving signals 7A and 7B, which are applied to the first and second signal electrodes 51A and 51B of the Mach-Zehnder optical modulator 51 for driving the Mach-Zehnder optical modulator 51. The complementary first and second electric driving signals 7A and 7B are amplitude-modulated by the low frequency signal superimposed to the bias voltage, while the complementary first and second electric driving signals 7A and 7B have a full amplitude "$2V\pi$" which is defined to be a potential difference between adjacent two minimum points of the light intensity or between adjacent two maximum points of the light intensity. The low frequency signal has a constant frequency of "$f_0$", and a wavelength of "$1/f_0$".

FIG. 2 illustrates typical three different states of extinction characteristic, which are represented by a continuous line with mark (a), a dotted line with mark (b) and a broken line with mark (c). In a first extinction characteristic state represented by the continuous line with mark (a), the light intensity takes a minimum value or a minimum point at the direct current bias voltage free of superimposition of the low frequency signal. This means that the first extinction characteristic state represented by the continuous line with mark (a) is optimum for a duo-binary modulation. The control to the operating point is so made that the minimum point of the light intensity always corresponds to the direct current bias voltage free of superimposition of the low frequency signal. The above-described full amplitude "2Vπ" or full width "2Vπ" of the complementary first and second electric driving signals 7A and 7B is essential.

FIG. 3A is a diagram illustrative of an output light waveform represented by a variation in light intensity over times in the first extinction characteristic state represented by the continuous line with mark (a) in FIG. 2. FIG. 3B is a diagram illustrative of an output light waveform represented by a variation in light intensity over times in the second extinction characteristic state represented by the dotted line with mark (b) in FIG. 2. FIG. 3C is a diagram illustrative of an output light waveform represented by a variation in light intensity over times in the third extinction characteristic state represented by the broken line with mark (c) in FIG. 2.

In the first extinction characteristic state represented by the continuous line with mark (a) in FIG. 2, as shown in FIG. 3A, the output light waveform has a wavelength of "$1/(2f_0)$" and a frequency of "$2f_0$", wherein "$f_0$" is the frequency of the low frequency signal superimposed to the complementary first and second electric driving signals. The reason why the output light waveform is characterized by "$2f_0$" or the double of the frequency "$f_0$" of the low frequency signal is appearance of a reflecting effect of the low frequency signal at the maximum points of the light intensity as shown in FIG. 2. For this reason, the direct current voltage error signal obtained by the synchronous detection by the phase comparator 6 is thus zero "0".

The first extinction characteristic state may be shifted to either the second extinction characteristic state represented by the dotted line with mark (b) in FIG. 2 or the third extinction characteristic state represented by the broken line with mark (c) in FIG. 2.

In the second extinction characteristic state represented by the dotted line with mark (b) in FIG. 2, as shown in FIG. 3B, the output light waveform has a wavelength of "$1/(f_0)$" and a frequency of "$f_0$", wherein "$f_0$" is the frequency of the low frequency signal superimposed to the complementary first and second electric driving signals. The reason why the output light waveform is characterized by the frequency "$f_0$" of the low frequency signal is no appearance of any reflecting effect at the maximum points of the light intensity as shown in FIG. 2. For this reason, the direct current voltage error signal obtained by the synchronous detection by the phase comparator 6 is thus non-zero-value which depends upon a variation amount of the operating point.

In the third extinction characteristic state represented by the broken line with mark (c) in FIG. 2, as shown in FIG. 3C, the output light waveform has the wavelength of "$1/(f_0)$" and the frequency of "$f_0$", wherein "$f_0$" is the frequency of the low frequency signal superimposed to the complementary first and second electric driving signals. The output light waveform shown in FIG. 3C has an inverted phase to the output light waveform shown in FIG. 3B. Namely, the output light waveform shown in FIG. 3C is shifted in phase by "π" from the output light waveform shown in FIG. 3B. The reason why the output light waveform is characterized by the frequency "$f_0$" of the low frequency signal is no appearance of any reflecting effect at the maximum points of the light intensity as shown in FIG. 2. For this reason, the direct current voltage error signal obtained by the synchronous detection by the phase comparator 6 is thus non-zero-value which depends upon a variation amount of the operating point. The direct current voltage error signal obtained in the third extinction characteristic state represented by the broken line with mark (c) in FIG. 2 has an opposite sign to the direct current voltage error signal obtained in the second extinction characteristic state represented by the dotted line with mark (b) in FIG. 2.

As described above, the output light waveform shown in FIG. 3C has an inverted phase to the output light waveform shown in FIG. 3B. Namely, the output light waveform shown in FIG. 3C is shifted in phase by "π" from the output light waveform shown in FIG. 3B. The direct current voltage error signal obtained in the third extinction characteristic state represented by the broken line with mark (c) in FIG. 2 has an opposite sign to the direct current voltage error signal obtained in the second extinction characteristic state represented by the dotted line with mark (b) in FIG. 2. These means that the sign of the direct current voltage error signal detected by the synchronous detection by the phase comparator 6 indicates the direction of the variation of the operating point or the direction of shifting the first extinction characteristic state to either the second or third extinction characteristic state. Namely, detection of the sign of the direct current voltage error signal detects the direction of the variation of the operating point. Also, the absolute value of the direct current voltage error signal detected by the synchronous detection by the phase comparator 6 indicates the magnitude or the amount of the variation of the operating point or the magnitude or the amount of shifting the first extinction characteristic state to either the second or third extinction characteristic state. Namely, detection of the absolute value of the direct current voltage error signal detects the magnitude or the amount of the variation of the operating point.

Accordingly, both the direction and the magnitude or amount of the variation of the operating point can be detected, so that the bias voltage level can be controlled based on the sign and the absolute value of the direct current voltage error signal detected by the synchronous detection by the phase comparator 6, whereby the operating point can be stabilized. Namely, the minimum value point of the extinction characteristic may be taken as the stable operating point.

Similarly, the maximum value point of the extinction characteristic may also be taken as the stable operating point. In this case of taking the maximum value point as the stable operating point, the sign, for example, plus and minus, of the direct current voltage error signal detected by the synchronous detection is opposite to the sign of the direct current voltage error signal in the above case of taking the minimum value point as the stable operating point.

The above-described conventional optical modulation system has a disadvantage in difficulty in controlling or suppressing an undesired variation or fluctuation of the operating point. This difficulty is caused by the following two issues.

The first issue is that the above-described full amplitude "2Vπ" or full width "2Vπ" of the complementary first and second electric driving signals 7A and 7B for driving the Mach-Zehnder optical modulator 51 is essential. The above-described full amplitude "2Vπ" or full width "2Vπ" makes a tolerance small, because the reflecting effect of the low frequency signal at the minimum value point or the maximum value point of the is utilized to detect the stable operating point.

The second issue is that a locking range of the operating point or a follow-range of the operating point is limited due to a finite vias voltage which can be supplied from the bias supplying circuit.

In the above circumstances, the development of a novel optical modulation system free from the above problems is desirable.

SUMMARY OF THE INVENTION

Accordingly, it is an object of the present invention to provide a novel optical modulation system free from the above problems.

It is a further object of the present invention to provide a novel optical modulation system including an optical modulator, wherein the optical modulation system is capable of controlling or suppressing an undesired variation or fluctuation of operating point.

It is a still further object of the present invention to provide a novel optical modulation system including an optical modulator, wherein the optical modulation system is capable of keeping a highly stable optimum operating point.

The present invention provides an optical modulation system including: an optical modulator generating an intensity-modulated output optical signal; an operating point detecting unit for receiving the intensity-modulated output optical signal from the optical modulator and detecting at least one of a direction and a magnitude of a variation of an operating point from an intended operating point, based on a low frequency signal component included in the intensity-modulated output optical signal, and the operating point detecting unit generating a direct current error signal which represents the at least one of the direction and the magnitude of the variation of the operating point from the intended operating point; and a signal supplying unit being functionally coupled to the operating point detecting unit for receiving the error signal and generating an output signal which includes a stationary direct current bias voltage, the direct current error signal and a low frequency signal having a first frequency, wherein a first signal electrode of the optical modulator is coupled to the signal supplying unit for causing that at the first signal electrode, the output signal is superimposed to an input driving signal having a second frequency higher than the second frequency, in order to generate, at the first signal electrode, an amplitude-modulated input driving signal waveform, which has a pair of same phase envelope lines, and which has a full width smaller than a potential difference between adjacent two of bias voltages at which an optical intensity of the intensity-modulated output optical signal takes a minimum value or between adjacent two of other bias voltages at which the optical intensity takes a maximum value.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
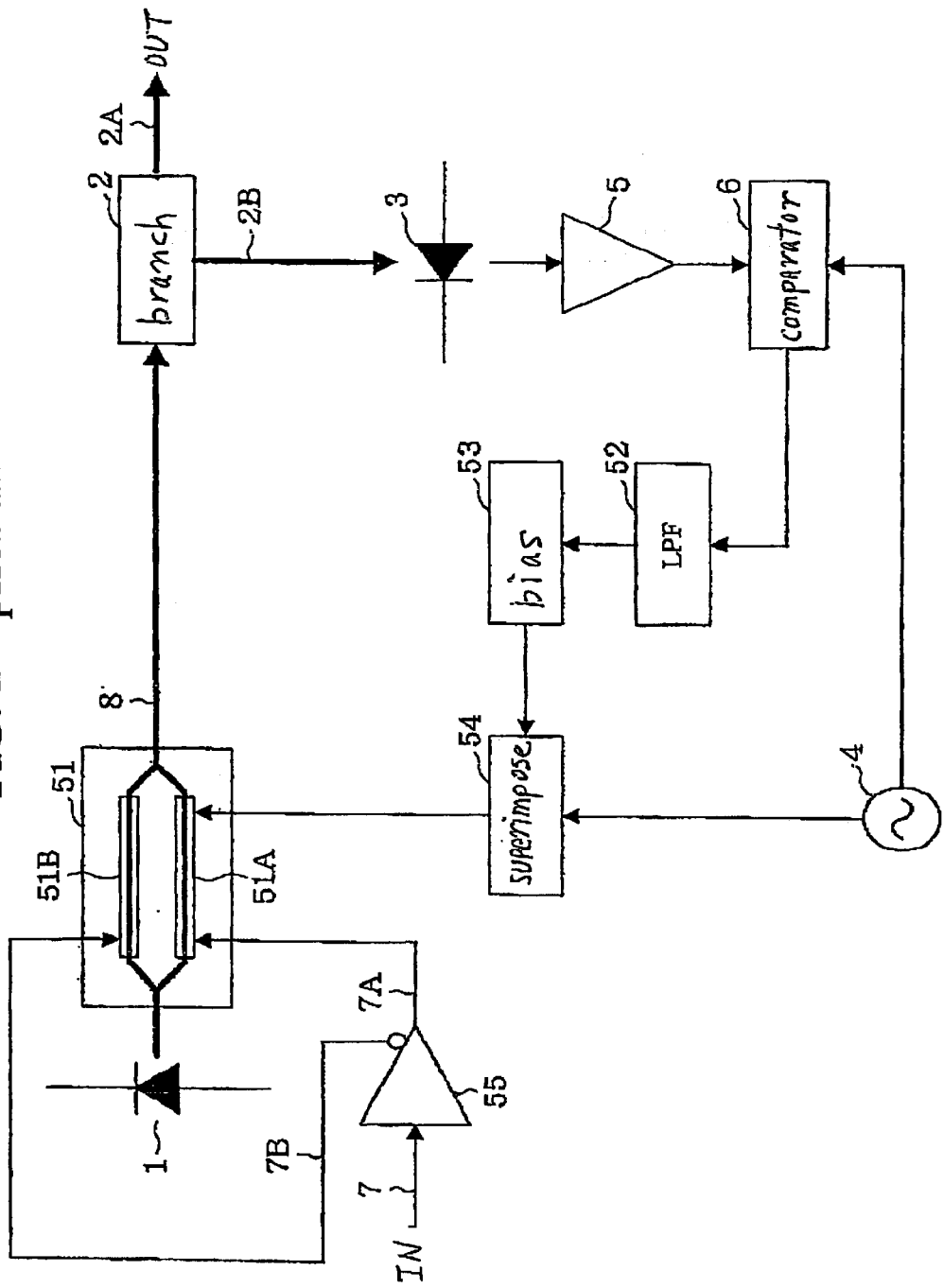
FIG. 1 is a diagram illustrative of a structure of a conventional optical modulation system including a Mach-Zehnder optical modulator.

A first aspect of the present invention is an optical modulation system including: an optical modulator generating an intensity-modulated output optical signal; an operating point detecting unit for receiving the intensity-modulated output optical signal from the optical modulator and detecting at least one of a direction and a magnitude of a variation of an operating point form an intended operating point, based on a low frequency signal component included in the intensity-modulated output optical signal, and the operating point detecting unit generating a direct current error signal which represents the at least one of the direction and the magnitude of the variation of the operating point from the intended operating point; and a signal supplying unit being functionally coupled to the operating point detecting unit for receiving the error signal and generating an output signal which includes a stationary direct current bias voltage, the direct current error signal and a low frequency signal having a first frequency, wherein a first signal electrode of the optical modulator is coupled to the signal supplying unit for causing that at the first signal electrode, the output signal is superimposed to an input driving signal having a second frequency higher than the second frequency, in order to generate, at the first signal electrode, an amplitude-modulated input driving signal waveform, which has a pair of same phase envelope line, and which has a full width smaller than a potential difference between adjacent two of bias voltages at which an optical intensity of the intensity-modulated output optical signal takes a minimum value or between adjacent two of other bias voltages at which the optical intensity takes a maximum value.

It is preferable that the signal supplying unit further includes: a low frequency signal generator being functionally coupled to the operating point detecting unit for supplying the low frequency signal having the first frequency to the operating point detecting unit, so that the operating point detecting unit detects the at least one of the direction and the magnitude of the variation of the operating point from the intended operating point, based on both the intensity-modulated output optical signal and the low frequency signal; and a bias supplying circuit being functionally coupled to the low frequency signal generator for receiving the low frequency signal and superimposing the low frequency signal to a direct current voltage component which includes the stationary direct current bias voltage and the direct current error signal.

It is preferable that the operating point detecting unit detects both the direction and the magnitude of the variation of the operating point from the intended operating point, and the direct current error signal represents both the direction and the magnitude of the variation of the operating point.

It is preferable that an absolute value of the direct current error signal represents the magnitude of the variation of the operating point, and a sign of the direct current error signal represents the direction of the variation of the operating point.

It is preferable that the input driving signal has a full width smaller than a potential difference between adjacent two of bias voltages at which an optical intensity of the intensity-modulated output optical signal takes a minimum value or between adjacent two of other bias voltages at which the optical intensity takes a maximum value.

It is preferable that the optical modulator further has a second signal electrode, and the signal supplying unit further generates an additional output signal which includes a polarity-opposite direct current voltage component which has an opposite polarity to a direct current voltage component of the output signal, and the signal supplying unit further supplies the additional output signal to the second signal electrode.

It is preferable that the additional output signal includes the polarity-opposite direct current voltage component only free of the low frequency signal.

It is preferable that the additional output signal includes not only the polarity-opposite direct current voltage component but also the low frequency signal, and the additional output signal has the same phase of the low frequency component as the output signal.

It is preferable that the polarity-opposite direct current voltage component includes only a polarity-opposite direct current error signal which has an opposite polarity to the direct current error signal included in the output signal.

It is preferable that the polarity-opposite direct current voltage component included in the additional output signal has the same absolute value as the direct current voltage component included in the output signal.

A second aspect of the present invention is an optical modulation system including: an optical modulator generating an intensity-modulated output optical signal; an operating point detecting unit for receiving the intensity-modulated output optical signal from the optical modulator and detecting at least one of a direction and a magnitude of a variation of an operating point from an intended operating point, based on a low frequency signal component included in the intensity-modulated output optical signal, and the operating point detecting unit generating a direct current error signal which represents the at least one of the direction and the magnitude of the variation of the operating point from the intended operating point; and a signal supplying unit being functionally coupled to the operating point detecting unit for receiving the error signal and generating both an output signal, which includes a direct current voltage component including the direct current error signal and a low frequency signal having a first frequency, and an additional output signal, which includes at least a polarity-opposite direct current voltage component which is opposite in polarity to the direct current voltage component, wherein first and second signal electrodes of the optical modulator are coupled to the signal supplying unit for causing that at the first signal electrode, the output signal is superimposed to an input driving signal having a second frequency higher than the second frequency, in order to generate, at the first signal electrode, an amplitude-modulated input driving signal waveform, and the second signal electrode receives the additional output signal.

It is preferable that the signal supplying unit further includes a low frequency signal generator being functionally coupled to the operating point detecting unit for supplying the low frequency signal having the first frequency to the operating point detecting unit, so that the operating point detecting unit detects the at least one of the direction and the magnitude of the variation of the operating point from the intended operating point, based on both the intensity-modulated output optical signal and the low frequency signal; and a bias supplying circuit being functionally coupled to the low frequency signal generator for receiving the low frequency signal and superimposing the low frequency signal to the direct current voltage component which includes a stationary direct current bias voltage and the direct current error signal.

It is preferable that the operating point detecting unit detects both the direction and the magnitude of the variation of the operating point from the intended operating point, and the direct current error signal represents both the direction and the magnitude of the variation of the operating point.

It is preferable that an absolute value of the direct current error signal represents the magnitude of the variation of the operating point, and a sign of the direct current error signal represents the direction of the variation of the operating point.

It is preferable that the input driving signal has a full width substantially equal to a potential difference between adjacent two of bias voltages at which an optical intensity of the intensity-modulated output optical signal takes a minimum value or between adjacent two of other bias voltages at which the optical intensity takes a maximum value.

It is preferable that the additional output signal includes the polarity-opposite direct current voltage component only free of the low frequency signal.

It is preferable that the additional output signal includes not only the polarity-opposite direct current voltage component but also the low frequency signal, and the additional output signal has the same phase of the low frequency component as the output signal.

It is preferable that the polarity-opposite direct current voltage component includes only a polarity-opposite direct current error signal which has an opposite polarity to the direct current error signal included in the output signal.

It is preferable that the polarity-opposite direct current voltage component included in the additional output signal has the same absolute value as the direct current voltage component included in the output signal.

It is preferable that the amplitude-modulated input driving signal has a pair of same phase envelope lines, and which has a full width smaller than a potential difference between adjacent two of bias voltages at which an optical intensity of the intensity-modulated output optical signal takes a minimum value or between adjacent two of other bias voltages at which the optical intensity takes a maximum value.

A third aspect of the present invention is a method of driving an optical modulator including: applying, to a first signal electrode of the optical modulator, an amplitude-modulated input driving signal waveform, which has a pair of same phase envelope lines, and which has a full width smaller than a potential difference between adjacent two of bias voltages at which an optical intensity of an intensity-modulated output optical signal from the optical modulator takes a minimum value or between adjacent two of other bias voltages at which the optical intensity takes a maximum value.

It is preferable that the amplitude-modulated input driving signal waveform is generated by the steps of: detecting at least one of a direction and a magnitude of a variation of an operating point from an intended operating point, based on a low frequency signal component included in the intensity-modulated output optical signal; generating a direct current error signal which represents the at least one of the direction and the magnitude of the variation of the operating point from the intended operating point; and generating an output signal which includes a stationary direct current bias voltage, the direct current error signal and a low frequency signal having a first frequency.

It is preferable that both the direction and the magnitude of the variation of the operating point are detected from the intended operating point, and the direct current error signal represents both the direction and the magnitude of the variation of the operating point.

It is preferable that an absolute value of the direct current error signal represents the magnitude of the variation of the operating point, and a sign of the direct current error signal represents the direction of the variation of the operating point.

It is preferable that the input driving signal has a full width smaller than a potential difference between adjacent two of bias voltages at which an optical intensity of the intensity-modulated output optical signal takes a minimum value or between adjacent two of other bias voltages at which the optical intensity takes a maximum value.

It is preferable to further include: generating an additional output signal which includes a polarity-opposite direct current voltage component which has an opposite polarity to a direct current voltage component of the output signal; and supplying the additional output signal to a second signal electrode of the optical modulator.

It is preferable that the additional output signal includes the polarity-opposite direct current voltage component only free of the low frequency signal.

It is preferable that the additional output signal includes not only the polarity-opposite direct current voltage component but also the low frequency signal, and the additional output signal has the same phase of the low frequency component as the output signal.

It is preferable that the polarity-opposite direct current voltage component includes only a polarity-opposite direct current error signal which has an opposite polarity to the direct current error signal included in the output signal.

It is preferable that the polarity-opposite direct current voltage component included in the additional output signal has the same absolute value as the direct current voltage component included in the output signal.

A fourth aspect of the present invention is a method for driving an optical modulator including: applying, to a first signal electrode of the optical modulator, an amplitude-modulated input driving signal waveform obtained by superimposing an input driving signal with an output signal, which includes a direct current voltage component including a direct current error signal and a low frequency signal having a first frequency; and applying, to a second signal electrode of the optical modulator, an additional output signal, which includes at least a polarity-opposite direct current voltage component which is opposite in polarity to the direct current voltage component.

It is preferable that the amplitude-modulated input driving signal waveform is generated by the steps of: detecting at least one of a direction and a magnitude of a variation of an operating point from an intended operating point, based on a low frequency signal component included in the intensity-modulated output optical signal; generating a direct current error signal which represents the at least one of the direction and the magnitude of the variation of the operating point from the intended operating point; and generating an output signal which includes a stationary direct current bias voltage, the direct current error signal and a low frequency signal having a first frequency.

It is preferable that both the direction and the magnitude of the variation of the operating point are detected from the intended operating point, and the direct current error signal represents both the direction and the magnitude of the variation of the operating point.

It is preferable that an absolute value of the direct current error signal represents the magnitude of the variation of the operating point, and a sign of the direct current error signal represents the direction of the variation of the operating point.

It is preferable that the input driving signal has a fall width substantially equal to a potential difference between adjacent two of bias voltages at which an optical intensity of the intensity-modulated output optical signal takes a minimum value or between adjacent two of other bias voltages at which the optical intensity takes a maximum value.

It is preferable that the input driving signal has a full width smaller than a potential difference between adjacent two of bias voltages at which an optical intensity of the intensity-modulated output optical signal takes a minimum value or between adjacent two of other bias voltages at which the optical intensity takes a maximum value.

It is preferable that the additional output signal includes the polarity-opposite direct current voltage component only free of the low frequency signal.

It is preferable that the additional output signal includes not only the polarity-opposite direct current voltage component but also the low frequency signal, and the additional output signal has the same phase of the low frequency component as the output signal.

It is preferable that the polarity-opposite direct current voltage component includes only a polarity-opposite direct current error signal which has an opposite polarity to the direct current error signal included in the output signal.

It is preferable that the polarity-opposite direct current voltage component included in the additional output signal has the same absolute value as the direct current voltage component included in the output signal.

This second aspect of the present invention has the same characteristics described above in connection with the first aspect of the present invention.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

Figure 4:
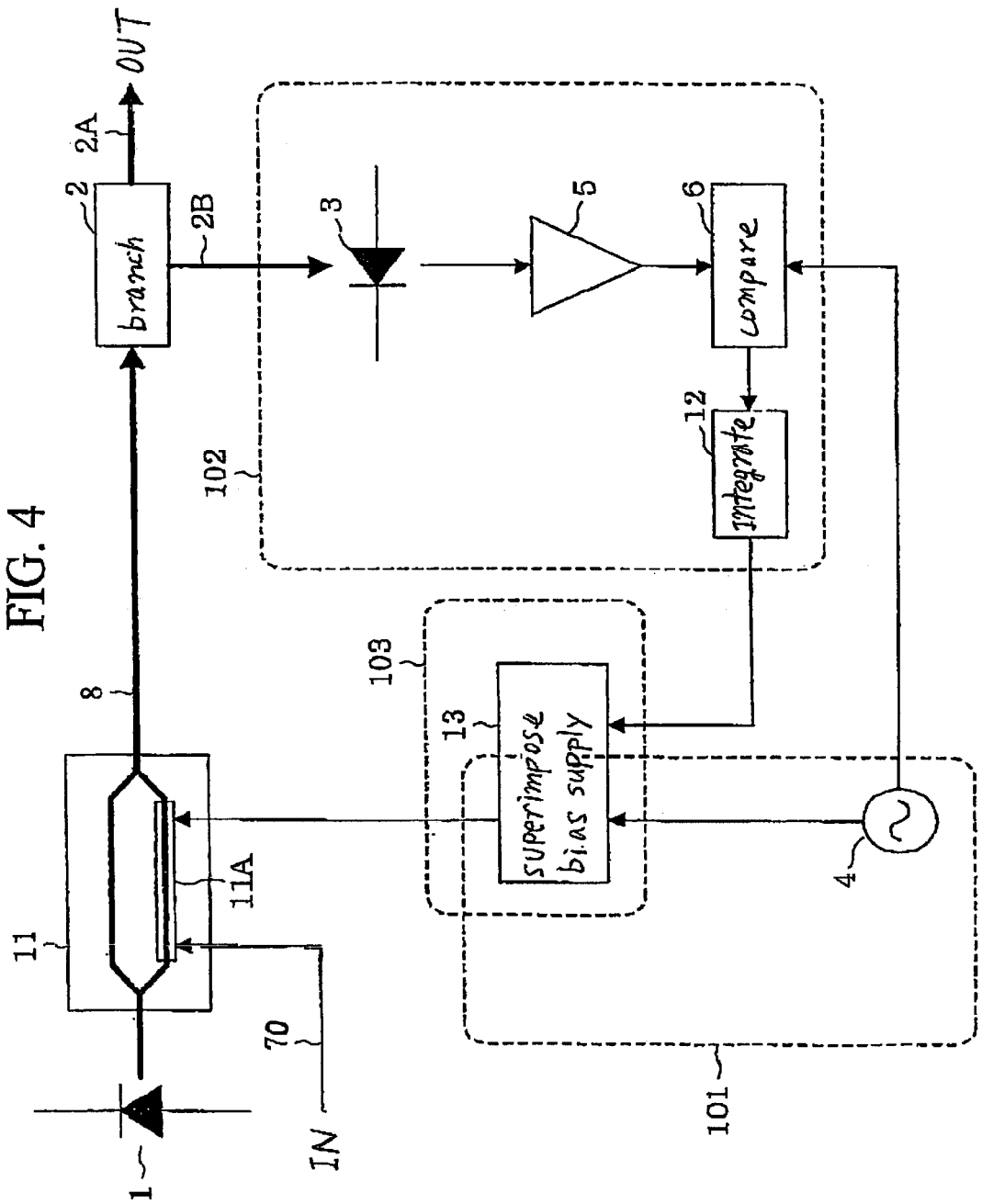
FIG. 4 is a diagram illustrative of a structure of a novel optical modulation system including a Mach-Zehnder optical modulator in a first embodiment in accordance with the present invention.

First Embodiment:

A first embodiment according to the present invention will be described in detail with reference to the drawings. FIG. 4 is a diagram illustrative of a structure of a novel optical modulation system including a Mach-Zehnder optical modulator in a first embodiment in accordance with the present invention. The novel optical modulation system may include a light source 1, a Mach-Zehnder optical modulator it, an optical branch circuit 2, a low frequency superimposing unit 101, an operating point detecting unit 102, and a bias supplying unit 103.

The operating point detecting unit 102 is functionally coupled to the optical branch circuit 2 and the low frequency superimposing unit 101 for receiving an optical output signal from the optical branch circuit 2 and an electric low frequency signal from the low frequency superimposing unit 101 in order to detect an operating point.

The low frequency superimposing unit 101 is functionally coupled to the operating point detecting unit 102 and the bias supplying unit 103 for supplying the electric low frequency signal to the operating point detecting unit 102, and superimposing the electric low frequency signal to a bias signal supplied from the bias supplying unit 103.

The bias supplying unit 103 is functionally coupled to the low frequency superimposing unit 101 and the operating point detecting unit 102 for receiving the electric low frequency signal from the low frequency superimposing unit 101 and also receiving an operating point detection signal from the operating point detecting unit 102, so that the bias supplying unit 103 generates an output signal and supplies the output signal to the Mach-Zehnder optical modulator 11.

The low frequency superimposing unit 101 may further include a low frequency oscillation circuit 4 and a first half part of a bias supplying circuit 13. The operating point detecting unit 102 may further include a photoelectric converter 3, an amplifier 5, a phase comparator 6 and an integrating circuit 12. The bias supplying unit 103 may include the bias supplying circuit 13.

The photoelectric converter 3 is functionally coupled to the optical branch circuit 2 for receiving the optical output signal as an optical feed-back signal from the optical branch circuit 2 and converting the optical output signal into an electric feed-back signal. The amplifier 5 is functionally coupled to the photoelectric converter 3 for receiving the converted electric feed-back signal and amplifying the same to generate an amplified electric feed-back signal.

The phase comparator 6 is functionally coupled to the amplifier 5 for receiving the amplified electric feed-back signal from the amplifier 5. The phase comparator 6 is also functionally coupled to the low frequency oscillation circuit 4 for receiving the low frequency signal from the low frequency oscillation circuit 4. The low frequency signal has a lower frequency "f0" which is much lower than the frequency of the input driving signal 70. The phase comparator 6 performs a synchronous detection by comparing the low frequency signal to the electric feed-back signal. The phase comparator 6 supplies a synchronously detected signal to the integrating circuit 12. The integrating circuit 12 is functionally coupled to the phase comparator 6 for receiving the synchronously detected signal from the phase comparator 6. The integrating circuit 12 performs a low pass filter function which extracts a direct current voltage error signal and also an amplification function which amplifies the extracted direct current voltage error signal. The integrating circuit 12 generates an amplified direct current voltage error signal. The low frequency signal has a lower frequency "f0" which is much lower than the frequency of the input driving signal 70.

The bias supplying circuit 13 is functionally coupled to the integrating circuit 12 for receiving the amplified direct current voltage error signal from the integrating circuit 12. The bias supplying circuit 13 is functionally coupled to the low frequency oscillation circuit 4 for receiving the low frequency signal from the low frequency oscillation circuit 4. The bias supplying circuit 13 performs separate addition operations or separate subtraction operations of the low frequency signal and the amplified direct current voltage error signal to or from a stationary direct current voltage signal. The bias supplying circuit 13 is functionally coupled to the Mach-Zehnder optical modulator 11 for supplying an output signal to a signal electrode 11A of the Mach-Zehnder optical modulator 11. Also, an input driving signal 70 is also applied to the signal electrode 11A of the Mach-Zehnder optical modulator 11, so that the output signal from the bias supplying circuit 13 is superimposed to the input driving signal 70.

The phase comparator 6 may comprise a mixer circuit, a digital multiplying circuit or an analog multiplying circuit. The photoelectric converter 3 may comprise a photo-diode, or an avalanche photo-diode.

The light source 1 emits a continuous wave light which is inputted into the Mach-Zehnder optical modulator 11, so that the Mach-Zehnder optical modulator 11 performs a light intensity modulation of the continuous wave light based on the input driving signal 70 superimposed with the output signal from the bias supplying circuit 13, which is applied to the signal electrode 11A.

The Mach-Zehnder optical modulator 11 includes a substrate as a medium of LiNbO3, and a waveguide formed in the substrate, wherein the waveguide comprises a single input side waveguide, symmetrically branched two center waveguides and a single output side waveguide which is connected through the symmetrically branched two center waveguides to the single input side waveguide. One of the symmetrically branched two center waveguides is provided with the signal electrode 11A which receives the input driving signal 70 and the output signal from the bias supplying circuit 13 for driving the Mach-Zehnder optical modulator 11.

Any electric signal may be available as the input driving signal 70 for driving the Mach-Zehnder optical modulator 11. Preferable examples of the input driving signal 70 may typically include, but not limited to, a binary digit electric data signal with any optional bit rate, a ternary digit electric data signal with any optional bit rate, an electric clock signal with any optional frequency. For example, an NRZ signal and an RZ signal are available as the binary digit electric data signal. A Duo-binary signal and a Dicode signal are available as the ternary digit electric data signal. A clock signal having a ½ frequency of the bit rate or an electric clock signal for generating a carrier suppressed-RZ signal.

Figure 5:
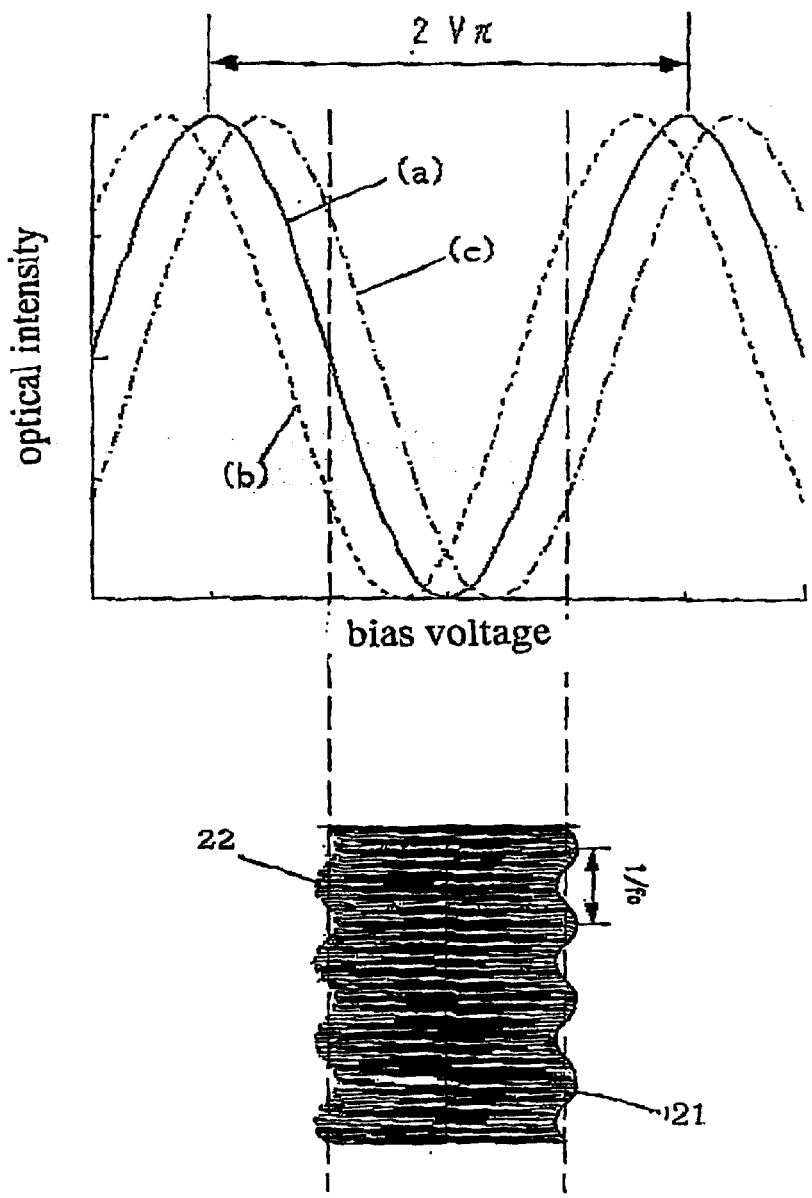
FIG. 5 is a view illustrative of a relationship of an extinction characteristic of the novel optical modulation system of FIG. 4 with reference to an amplitude-modulated input driving signal waveform.

In this example, the input driving signal 70 has a full width or a full amplitude which is smaller than $2V\pi$, or smaller than a potential difference between adjacent two of bias voltages at which the optical intensity takes the minimum value or adjacent two of other bias voltages at which the optical intensity takes the maximum value in the extinction characteristic. At the signal electrode 11A of the Mach-Zehnder optical modulator 11, the output signal including the low frequency signal from the bias supplying circuit 13 is superimposed to the input driving signal 70 in order to generate, at the signal electrode 11A, an amplitude-modulated input driving signal waveform with a pair of same-phased envelope lines 21 and 22 which define a full width or a full amplitude which is smaller than $2V\pi$, or smaller than a potential difference between adjacent two of bias voltages at which the optical intensity takes the minimum value or adjacent two of other bias voltages at which the optical intensity takes the maximum value in the extinction characteristic. FIG. 5 is a view illustrative of a relationship of an extinction characteristic of the novel optical modulation system of FIG. 4 with reference to an amplitude-modulated input driving signal waveform. The paired same-phased envelope lines 21 and 22 have the same phase and the same amplitude as each other as well as the same frequency and wavelength as each other.

The Mach-Zehnder optical modulator 11 performs an optical intensity-modulation of the inputted continuous wave light from the light source 1 based on the amplitude-modulated input driving signal waveform shown in FIG. 5. The Mach-Zehnder optical modulator 11 generates an intensity-modulated optical output signal 8 which is traveled to the optical branch circuit 2. The optical branch circuit 2 divides the intensity-modulated optical output signal 8 into a first intensity-modulated optical output signal 2A as an optical transmission signal and a second intensity-modulated optical output signal 2B as an optical feed-back signal.

The second intensity-modulated light signal 2B as the optical feed-back signal is supplied to the photoelectric converter 3 and converted into an electric feed-back signal by the photoelectric converter 3. The electric feed-back signal is then supplied to the amplifier 5 and amplified by the amplifier 5. The amplified electric feed-back signal is then supplied to the phase comparator 6. The low frequency signal from the low frequency oscillation circuit 4 is also supplied to the phase comparator 6. The phase comparator 6 performs a synchronous detection by comparing the low frequency signal to the amplified electric feed-back signal, so that the phase comparator 6 generates a synchronously detected signal. The synchronously detected signal is supplied to the integrating circuit 12, so that the integrating circuit 12 performs a low pass filter function which extracts a direct current voltage error signal from the synchronously detected signal and also performs an amplification function which amplifies the extracted direct current voltage error signal. The integrating circuit 12 generates an amplified direct current voltage error signal.

The amplified direct current voltage error signal is supplied to the bias supplying circuit 13. The low frequency signal is also supplied from the low frequency oscillation circuit 4 to the bias supplying circuit 13. The bias supplying circuit 13 performs separate addition operations or separate subtraction operations of the low frequency signal and the amplified direct current voltage error signal to or from a stationary direct current voltage signal, so that the bias supplying circuit 13 generates a modified bias signal which includes the low frequency signal of a frequency "f0" and the direct current voltage error signal. The modified bias signal is then supplied to the signal electrode 11A of the Mach-Zehnder optical modulator 11. Also, the input driving signal 70 is also applied to the signal electrode 11A of the Mach-Zehnder optical modulator 11, so that the modified bias signal from the bias supplying circuit 13 is superimposed to the input driving signal 70, whereby the input driving signal 70 is amplitude-modified by the low frequency signal of the frequency "f0" which is much lower than the frequency of the input driving signal 70, thereby to generate, at the signal electrode 11A, the above-described amplitude-modulated input driving signal waveform with the paired same-phased envelope lines 21 and 22 represented by wavy lines which define the frequency "f0" and a wavelength "1/f0" as well as define a full width or a full amplitude which is smaller than $2V\pi$, or smaller than a potential difference between adjacent two of bias voltages at which the optical intensity takes the minimum value or adjacent two of other bias voltages at which the optical intensity takes the maximum value in the extinction characteristic.

The extinction characteristic of the Mach-Zehnder optical modulator 11 may be controlled so that either the minimum value or the maximum value of the light intensity corresponds to the direct current bias voltage. In this example, the extinction characteristic is controlled so that the minimum value of the light intensity corresponds to the direct current bias voltage as shown in FIG. 5.

As described above, the signal electrode 11A of the Mach-Zehnder optical modulator 11 receives the amplitude-modulated input driving signal waveform with the paired same-phased envelope lines 21 and 22 which define the full width or the full amplitude which is smaller than $2V\pi$, or smaller than the potential difference between adjacent two of bias voltages at which the optical intensity takes the minimum value or adjacent two of other bias voltages at which the optical intensity takes the maximum value in the extinction characteristic.

Figure 2:
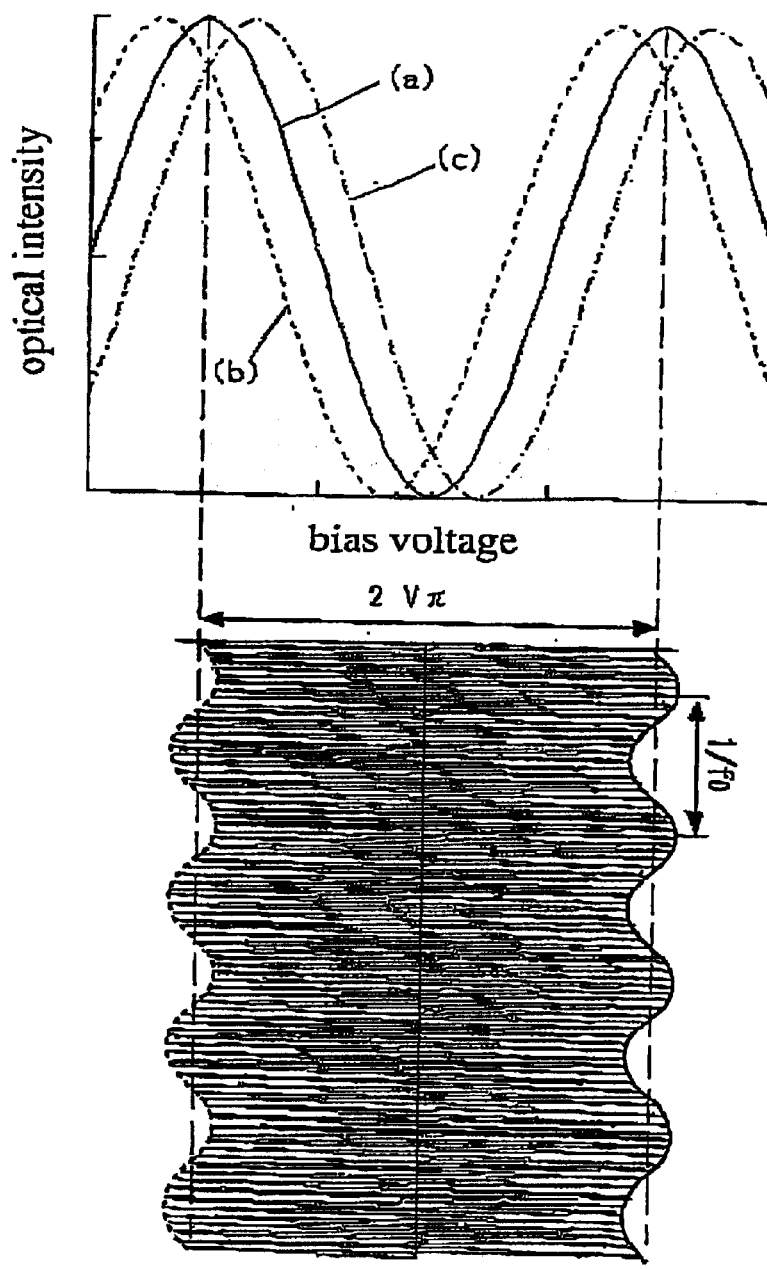
FIG. 2 is a view illustrative of a relationship of an extinction characteristic of the conventional optical modulation system with reference to electric driving signals amplitude-modulated by a low frequency signal superimposed to the bias voltage.
Figure 3A:
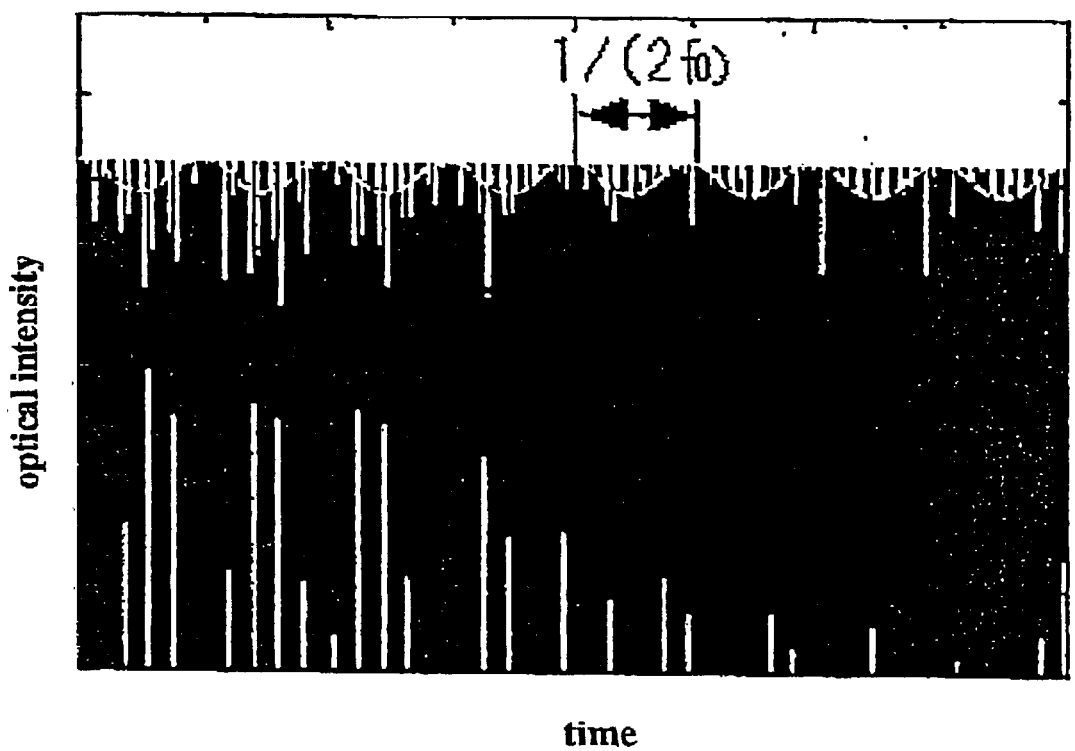
FIG. 3A is a diagram illustrative of an output light waveform represented by a variation in light intensity over times in the first extinction characteristic state represented by the continuous line with mark (a) in FIG. 2.
Figure 3B:
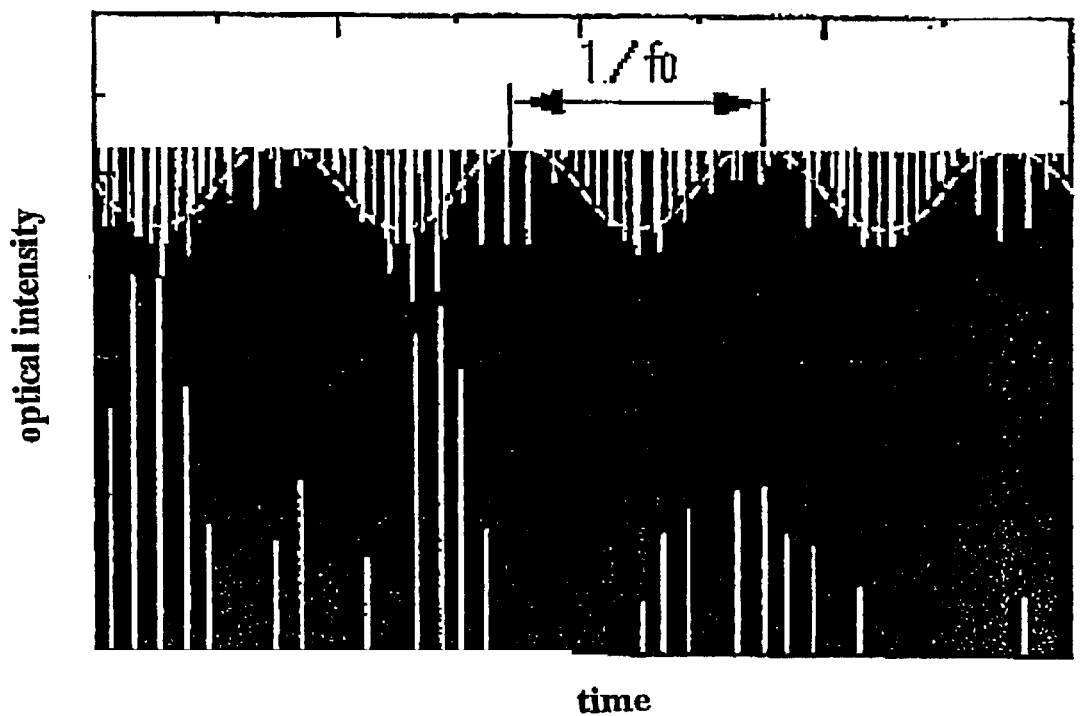
FIG. 3B is a diagram illustrative of an output light waveform represented by a variation in light intensity over times in the second extinction characteristic state represented by the dotted line with mark (b) in FIG. 2.
Figure 3C:
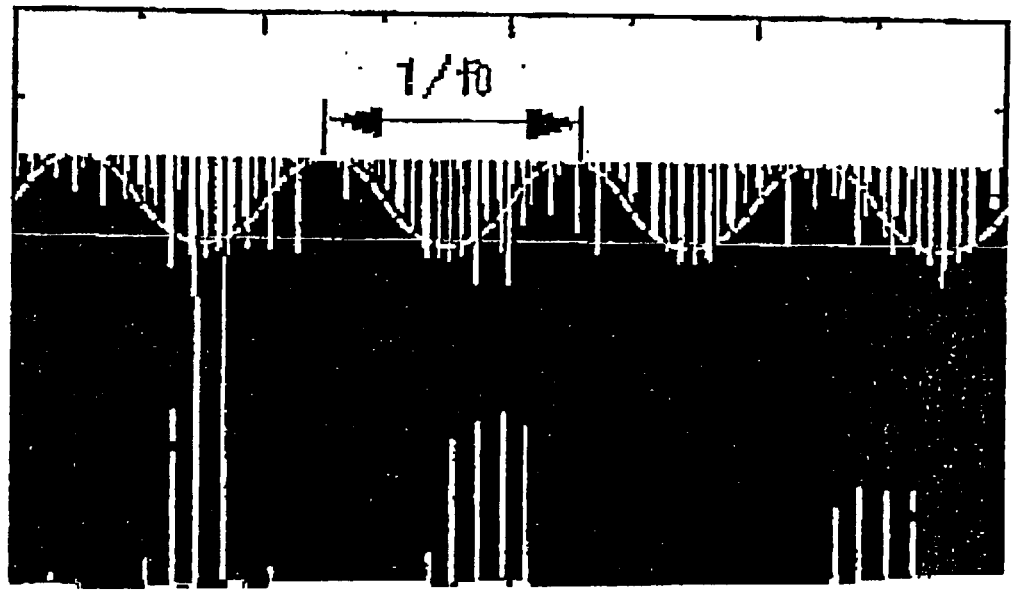
FIG. 3C is a diagram illustrative of an output light waveform represented by a variation in light intensity over times in the third extinction characteristic state represented by the broken line with mark (c) in FIG. 2.

As shown in FIG. 5, the paired same-phased envelope lines 21 and 22 correspond to two sloped regions of the extinction characteristic curve between the minimum value point and the maximum value points. The two sloped regions of the extinction characteristic curve have opposite gradients to each other. The envelope line 21 corresponds to the positive gradient region of the extinction characteristic curve, while the envelope line 22 corresponds to the negative gradient region of the extinction characteristic curve. Namely the paired same-phased envelope lines 21 and 22 are positioned corresponding to the sloped regions which are inside of the two maximum value points of the extinction characteristic curve. As compression, as shown in FIG. 2, the envelope lines of the input signal waveform of the conventional system are correspond to two adjacent maximum value points of the extinction characteristic curve of the conventional system. This difference in the positions of the paired same-phased envelope lines between the novel and conventional systems means that the novel system exhibits the intensity modulation operation quite different from the intensity modulation operation of the conventional system.

Figure 6A:
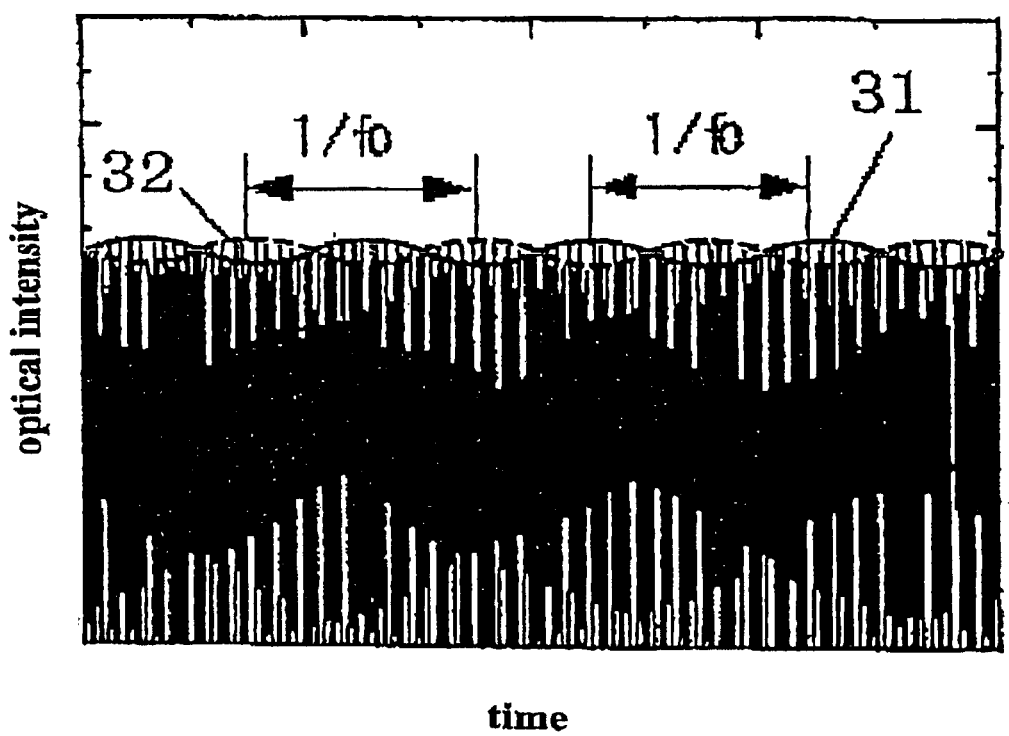
FIG. 6A is a diagram illustrative of an output light waveform represented by a variation in light intensity over times in the first extinction characteristic state represented by the continuous line with mark (a) in FIG. 5.
Figure 6B:
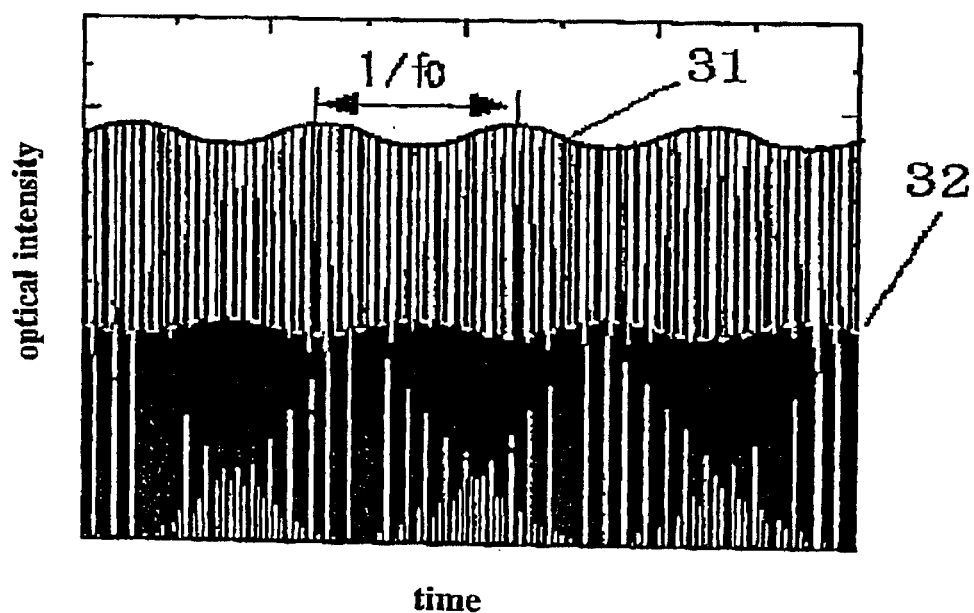
FIG. 6B is a diagram illustrative of an output light waveform represented by a variation in light intensity over times in the second extinction characteristic state represented by the dotted line with mark (b) in FIG. 5.
Figure 6C:
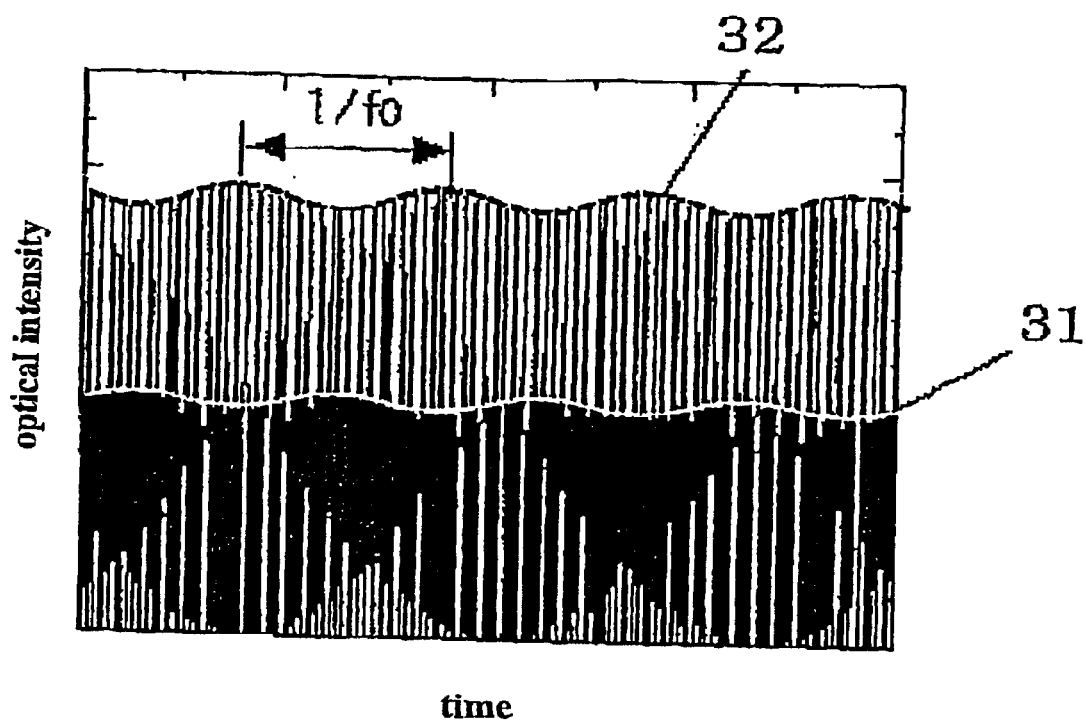
FIG. 6C is a diagram illustrative of an output light waveform represented by a variation in light intensity over times in the third extinction characteristic state represented by the broken line with mark (c) in FIG. 5.

FIG. 5 illustrates typical three different states of extinction characteristic, which are represented by a continuous line with mark (a), a dotted line with mark (b) and a broken line with mark (c). In a first extinction characteristic state represented by the continuous line with mark (a), the light intensity takes a minimum value or a minimum point at the direct current bias voltage free of superimposition of the low frequency signal. FIG. 6A is a diagram illustrative of an output light waveform represented by a variation in light intensity over times in the first extinction characteristic state represented by the continuous line with mark (a) in FIG. 5. FIG. 6B is a diagram illustrative of an output light waveform represented by a variation in light intensity over times in the second extinction characteristic state represented by the dotted line with mark (b) in FIG. 5. FIG. 6C is a diagram illustrative of an output light waveform represented by a variation in light intensity over times in the third extinction characteristic state represented by the broken line with mark (c) in FIG. 5.

In the first extinction characteristic state represented by the continuous line with mark (a) in FIG. 5, as shown in FIG. 6A, the intensity-modulated optical output signal 8 from the Mach-Zehnder optical modulator 11 has a wavelength of "$1/(f_0)$" and a frequency of "$f_0$", wherein "$f_0$" is the frequency of the low frequency signal outputted from the low frequency oscillation circuit 4 and superimposed to the input driving signal 70. Namely, the frequency "$f_0$" of the low frequency signal outputted from the low frequency oscillation circuit 4 appears on the intensity-modulated optical output signal 8 from the Mach-Zehnder optical modulator 11. Note that the frequency "$2f0$", however, does not appear on the intensity-modulated optical output signal 8 from the Mach-Zehnder optical modulator 11. The intensity-modulated optical output signal 8 from the Mach-Zehnder optical modulator 11 has a pair of different-phased envelope lines 31 and 32 represented by wavy lines and different in phase by "$\pi$" from each other. The paired different-phased envelope lines 31 and 32 have the same amplitude as each other and the same frequency and wavelength as each other, for which reason the respective frequency components "$f0$" of the paired different-phased envelope lines 31 and 32 are totally canceled to each other, whereby the direct current voltage error signal obtained by the synchronous detection by the phase comparator 6 is thus zero "0".

The first extinction characteristic state may be shifted to either the second extinction characteristic state represented by the dotted line with mark (b) in FIG. 5 or the third extinction characteristic state represented by the broken line with mark (c) in FIG. 5.

In the second extinction characteristic state represented by the dotted line with mark (b) in FIG. 5, as shown in FIG. 6B, the intensity-modulated optical output signal 8 from the Mach-Zehnder optical modulator 11 has a wavelength of "$1/(f_0)$" and a frequency of "$f_0$", wherein "$f_0$" is the frequency of the low frequency signal outputted from the low frequency oscillation circuit 4 and superimposed to the input driving signal 70. Namely, the frequency "$f_0$" of the low frequency signal outputted from the low frequency oscillation circuit 4 appears on the intensity-modulated optical output signal 8 from the Mach-Zehnder optical modulator 11. Note that the frequency "$2f0$", however, does not appear on the intensity-modulated optical output signal 8 from the Mach-Zehnder optical modulator 11. The intensity-modulated optical output signal 8 from the Mach-Zehnder optical modulator 11 has a pair of different-phased envelope lines 31 and 32 represented by wavy lines and different in phase by "$\pi$" from each other, provided that the envelope line 31 is shifted up, while the envelope line 32 is shifted down as shown in FIG. 6B. The envelope line 31 lies above the envelope line 32. The envelope line 31 shown in FIG. 6B corresponds to the envelope line 21 shown in FIG. 5. The envelope line 32 shown in FIG. 6B corresponds to the envelope line 22 shown in FIG. 5. For the second extinction characteristic state represented by the dotted line with mark (b) in FIG. 5, the optical intensity takes a larger value at a corresponding voltage level to the envelope line 21 than at another corresponding voltage level to the envelope line 22, for which reason the envelope line 31 lies above the envelope line 32.

Unless the input driving signal 70 has a full width or amplitude of "$V\pi$" and zero-rising time and zero-falling time, since the intensity-modulated optical output signal 8 from the Mach-Zehnder optical modulator 11 has the envelopes 31 and 32 which are different in phase by "$\pi$" from each other and also different in amplitude from each other, then the low frequency component "$f0$" can be synchronously detected and a direct current voltage error signal can be obtained, which indicates the magnitude or the amount of the variation of the operating point or the magnitude or the amount of shifting the first extinction characteristic state to either the second or third extinction characteristic state. Namely, detection of the absolute value of the direct current voltage error signal detects the magnitude or the amount of the variation of the operating point.

In the third extinction characteristic state represented by the broken line with mark (c) in FIG. 5, as shown in FIG. 6C, the intensity-modulated optical output signal 8 from the Mach-Zehnder optical modulator 11 also has a wavelength of "$1/(f_0)$" and a frequency of "$f_0$", wherein "$f_0$" is the frequency of the low frequency signal outputted from the low frequency oscillation circuit 4 and superimposed to the input driving signal 70. Namely, the frequency "$f_0$" of the low frequency signal outputted from the low frequency oscillation circuit 4 appears on the intensity-modulated optical output signal 8 from the Mach-Zehnder optical modulator 11. Note that the frequency "$2f0$", however, does not appear on the intensity-modulated optical output signal 8 from the Mach-Zehnder optical modulator 11. The intensity-modulated optical output signal 8 from the Mach-Zehnder optical modulator 11 has a pair of different-phased envelope lines 31 and 32 represented by wavy lines and different in phase by "$\pi$" from each other, provided that the envelope line 31 is shifted down, while the envelope line 32 is shifted up as shown in FIG. 6C. The envelope line 31 lies below the envelope line 32. The envelope line 31 shown in FIG. 6C corresponds to the envelope line 21 shown in FIG. 5. The envelope line 32 shown in FIG. 6C corresponds to the envelope line 22 shown in FIG. 5. For the third extinction characteristic state represented by the broken line with mark (c) in FIG. 5, the optical intensity takes a smaller value at a corresponding voltage level to the envelope line 21 than at another corresponding voltage level to the envelope line 22, for which reason the envelope line 31 lies below the envelope line 32.

Unless the input driving signal 70 has a full width or amplitude of "$V\pi$" and zero-rising time and zero-falling time, since the intensity-modulated optical output signal 8 from the Mach-Zehnder optical modulator 11 has the envelopes 31 and 32 which are different in phase by "$\pi$" from each other and also different in amplitude from each other, then the low frequency component "$f0$" can be synchronously detected and a direct current voltage error signal can be obtained, which indicates the magnitude or the amount of the variation of the operating point or the magnitude or the amount of shifting the first extinction characteristic state to either the second or third extinction characteristic state. Namely, detection of the absolute value of the direct current voltage error signal detects the magnitude or the amount of the variation of the operating point.

It should be noted that in the second extinction characteristic state shown in FIG. 6B, the envelope line 31 is significant, while in the third extinction characteristic state shown in FIG. 6C, the envelope line 32 different in phase by "π" is significant. For this reason, the direct current voltage error signal obtained by the synchronous detection in the second extinction characteristic state shown in FIG. 6B has a different or opposite sign to the direct current voltage error signal obtained by the synchronous detection in the third extinction characteristic state shown in FIG. 6C. These means that the sign of the direct current voltage error signal detected by the synchronous detection by the phase comparator 6 indicates the direction of the variation of the operating point or the direction of shifting the first extinction characteristic state to either the second or third extinction characteristic state. Namely, detection of the sign of the direct current voltage error signal detects the direction of the variation of the operating point. Also, as described above, the absolute value of the direct current voltage error signal detected by the synchronous detection by the phase comparator 6 indicates the magnitude or the amount of the variation of the operating point or the magnitude or the amount of shifting the first extinction characteristic state to either the second or third extinction characteristic state. Namely, detection of the absolute value of the direct current voltage error signal detects the magnitude or the amount of the variation of the operating point.

Accordingly, both the direction and the magnitude or amount of the variation of the operating point can be detected, so that the bias voltage level can be controlled based on the sign and the absolute value of the direct current voltage error signal detected by the synchronous detection by the phase comparator 6, whereby the operating point can be stabilized. Namely, the minimum value point of the extinction characteristic may be taken as the stable operating point.

In this example, the input driving signal 70 has a full width or a full amplitude which is smaller than $2V\pi$, or smaller than a potential difference between adjacent two of bias voltages at which the optical intensity takes the minimum value or adjacent two of other bias voltages at which the optical intensity takes the maximum value in the extinction characteristic. At the signal electrode 11A of the Mach-Zehnder optical modulator 11, the output signal including the low frequency signal from the bias supplying circuit 13 is superimposed to the input driving signal 70 in order to generate, at the signal electrode 11A, an amplitude-modulated input driving signal waveform with a pair of same-phased envelope lines 21 and 22 which define a full width or a fill amplitude which is smaller than $2V\pi$, or smaller than a potential difference between adjacent two of bias voltages at which the optical intensity takes the minimum value or adjacent two of other bias voltages at which the optical intensity takes the maximum value in the extinction characteristic. This makes it ensured or easy that the above-described novel optical modulation system is capable of controlling or suppressing an undesired variation or fluctuation of the operating point.

In general, the increase in the bit rate of the input driving signal 70 or the increase in the frequency of the amplitude-modulated input driving signal, which drives the Mach-Zehnder optical modulator 11, makes it difficult to increase the full width or amplitude of the amplitude-modulated input driving signal. In accordance with the present invention, however, the full width of the amplitude-modulated input driving signal should be smaller than $2V\pi$, or smaller than the potential difference between adjacent two of bias voltages at which the optical intensity takes the minimum value or adjacent two of other bias voltages at which the optical intensity takes the maximum value in the extinction characteristic. Namely, it is unnecessary to generate the amplitude-modulated input driving signal having the large fall width of $2V\pi$. This makes it ensured or easy that the above-described novel optical modulation system is capable of controlling or suppressing an undesired variation or fluctuation of the operating point.

As described above, the feed-back control to the bias voltage level is made based on the direct current voltage error signal obtained by the synchronous detection, wherein an optimum feed-back coefficient can be selected so that only the minimum value point of the extinction characteristic curve is the stable operating point. Alternatively, another optimum feed-back coefficient can be selected so that only the maximum value point of the extinction characteristic curve is the stable operating point.

As possible modifications to the above embodiment, instead of the above-described case of taking the minimum value point as the stable operating point, the maximum value point of the extinction characteristic may also be taken as the stable operating point. In this case of taking the maximum value point as the stable operating point, the sign, for example, plus and minus, of the direct current voltage error signal detected by the synchronous detection is opposite to the sign of the direct current voltage error signal in the above case of taking the minimum value point as the stable operating point.

In the above-described embodiment, the Mach-Zehnder optical modulator 11 has the single signal electrode 11A along one of the symmetrically branched two center waveguides for receives the input driving signal 70 and the output signal from the bias supplying circuit 13 for the purpose of driving the Mach-Zehnder optical modulator 11 in a mono-pole driving method.

It is possible as a modification that the Mach-Zehnder optical modulator 11 has a pair of the signal electrodes 11A and 11B along the symmetrically branched two center waveguides respectively for enabling that the signal electrode 11A receives the input driving signal 70 and the output signal from the bias supplying circuit 13, while the signal electrode 11A receives another input driving signal complementary to the input driving signal 70 for the purpose of driving the Mach-Zehnder optical modulator 11 in a push-pull driving method.

It is also possible as another modification that either a low pass filter or a band-pass filter may optionally be inserted into between the photoelectric converter 3 and the amplifier 5. The above-described respective functional elements and/or the respective functional units may be modified in configuration unless the same or necessary functions can not be obtained.

Accordingly, the input driving signal 70 has a full width or a full amplitude which is smaller than $2V\pi$, or smaller than a potential difference between adjacent two of bias voltages at which the optical intensity takes the minimum value or adjacent two of other bias voltages at which the optical intensity takes the maximum value in the extinction characteristic. At the signal electrode 11A of the Mach-Zehnder optical modulator 11, the output signal including the low frequency signal from the bias supplying circuit 13 is superimposed to the input driving signal 70 in order to generate, at the signal electrode 11A, an amplitude-modulated input driving signal waveform with a pair of same-phased envelope lines 21 and 22 which define a full width or a full amplitude which is smaller than $2V\pi$, or smaller than a potential difference between adjacent two of bias voltages at which the optical intensity takes the minimum value or adjacent two of other bias voltages at which the optical intensity takes the maximum value in the extinction characteristic. This makes it ensured or easy that the above-described novel optical modulation system is capable of controlling or suppressing an undesired variation or fluctuation of the operating point.

Figure 7:
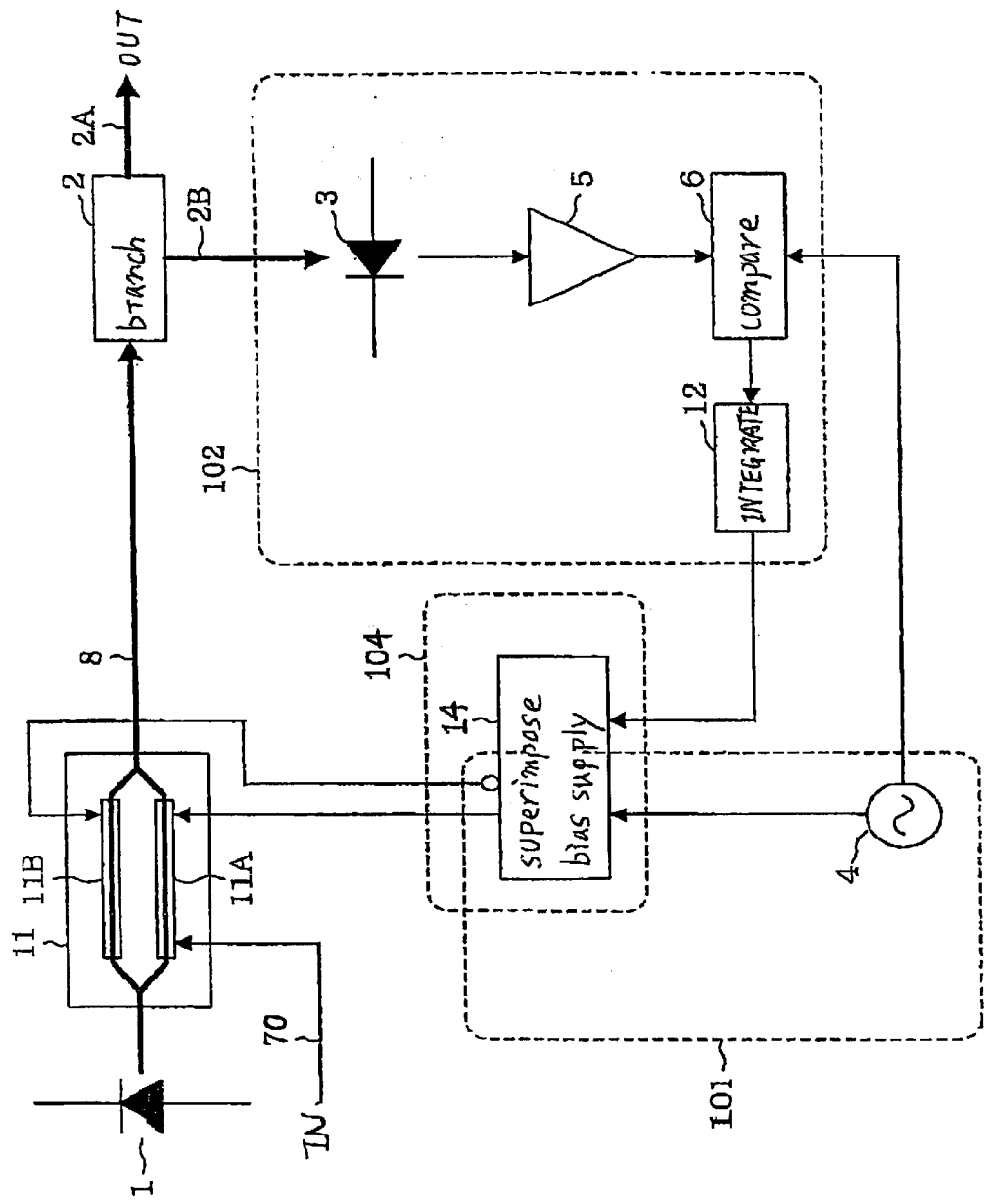
FIG. 7 is a diagram illustrative of a structure of a novel optical modulation system including a Mach-Zehnder optical modulator in a second embodiment in accordance with the present invention.

Second Embodiment:

A second embodiment according to the present invention will be described in detail with reference to the drawings. FIG. 7 is a diagram illustrative of a structure of a novel optical modulation system including a Mach-Zehnder optical modulator in a second embodiment in accordance with the present invention. The novel optical modulation system may include a light source 1, a Mach-Zehnder optical modulator 11, an optical branch circuit 2, a low frequency superimposing unit 101, an operating point detecting unit 102, and a bias supplying unit 104.

The operating point detecting unit 102 is functionally coupled to the optical branch circuit 2 and the low frequency superimposing unit 101 for receiving an optical output signal from the optical branch circuit 2 and an electric low frequency signal from the low frequency superimposing unit 101 in order to detect an operating point.

The low frequency superimposing unit 101 is functionally coupled to the operating point detecting unit 102 and the bias supplying unit 104 for supplying the electric low frequency signal to the operating point detecting unit 102, and superimposing the electric low frequency signal to a bias signal supplied from the bias supplying unit 104.

The bias supplying unit 104 is functionally coupled to the low frequency superimposing unit 101 and the operating point detecting unit 102 for receiving the electric low frequency signal from the low frequency superimposing unit 101 and also receiving an operating point detection signal from the operating point detecting unit 102, so that the bias supplying unit 104 generates an output signal and supplies the output signal to the Mach-Zehnder optical modulator 11.

The low frequency superimposing unit 101 may further include a low frequency oscillation circuit 4 and a first half part of a bias supplying circuit 14 which is different from the bias supplying circuit 14 of the above-described first embodiment. The operating point detecting unit 102 may further include a photoelectric converter 3, an amplifier 5, a phase comparator 6 and an integrating circuit 12. The bias supplying unit 104 may include the bias supplying circuit 14

The photoelectric converter 3 is functionally coupled to the optical branch circuit 2 for receiving the optical output signal as an optical feed-back signal from the optical branch circuit 2 and converting the optical output signal into an electric feed-back signal. The amplifier 5 is functionally coupled to the photoelectric converter 3 for receiving the converted electric feed-back signal and amplifying the same to generate an amplified electric feed-back signal.

The phase comparator 6 is functionally coupled to the amplifier 5 for receiving the amplified electric feed-back signal from the amplifier 5. The phase comparator 6 is also functionally coupled to the low frequency oscillation circuit 4 for receiving the low frequency signal from the low frequency oscillation circuit 4. The low frequency signal has a lower frequency "f0" which is much lower than the frequency of the input driving signal 70. The phase comparator 6 performs a synchronous detection by comparing the low frequency signal to the electric feed-back signal. The phase comparator 6 supplies a synchronously detected signal to the integrating circuit 12. The integrating circuit 12 is functionally coupled to the phase comparator 6 for receiving the synchronously detected signal from the phase comparator 6. The integrating circuit 12 performs a low pass filter function which extracts a direct current voltage error signal and also an amplification function which amplifies the extracted direct current voltage error signal. The integrating circuit 12 generates an amplified direct current voltage error signal.

The bias supplying circuit 14 is functionally coupled to the integrating circuit 12 for receiving the amplified direct current voltage error signal from the integrating circuit 12. The bias supplying circuit 14 is functionally coupled to the low frequency oscillation circuit 4 for receiving the low frequency signal from the low frequency oscillation circuit 4. The bias supplying circuit 14 performs separate addition operations or separate subtraction operations of the low frequency signal and the amplified direct current voltage error signal to or from a stationary direct current voltage signal. The bias supplying circuit 14 is functionally coupled to the Mach-Zehnder optical modulator 11 for supplying a non-inverted output signal to a signal electrode 11A of the Mach-Zehnder optical modulator 11 and further supplying an inverted output signal to another signal electrode 11B. Also, an input driving signal 70 is also applied to the signal electrode 11A of the Mach-Zehnder optical modulator 11, so that the non-inverted output signal from the bias supplying circuit 14 is superimposed to the input driving signal 70.

The light source 1 emits a continuous wave light which is inputted into the Mach-Zehnder optical modulator 11, so that the Mach-Zehnder optical modulator 11 performs a light intensity modulation of the continuous wave light based on the input driving signal 70 super-imposed with the output signal from the bias supplying circuit 14, which is applied to the signal electrode 11A.

The Mach-Zehnder optical modulator 11 includes a substrate as a medium of LiNbO3, and a waveguide formed in the substrate, wherein the waveguide comprises a single input side waveguide, symmetrically branched two center waveguides and a single output side waveguide which is connected through the symmetrically branched two center waveguides to the single input side waveguide. One of the symmetrically branched two center waveguides is provided with the signal electrode 11A which receives the input driving signal 70 and the non-inverted output signal from the bias supplying circuit 14 for driving the Mach-Zehnder optical modulator 11. Another of the symmetrically branched two center waveguides is provided with the signal electrode 11B which receives the inverted output signal from the bias supplying circuit 14 for driving the Mach-Zehnder optical modulator 11. Each of the non-inverted and inverted output signals from the bias supplying circuit 14 includes the low frequency signal component from the low frequency oscillation circuit 4 and a direct current voltage component, wherein the direct current voltage component further includes a stationary direct current voltage and the direct current voltage error signal from the operating point detecting unit 102. The direct current voltage component of the non-inverted output signal applied to the signal electrode 11A of the Mach-Zehnder optical modulator 11 has an opposite polarity to the direct current voltage component of the inverted output signal applied to the signal electrode 11B. Each of the non-inverted and inverted output signals from the bias supplying circuit 14 includes the low frequency components. The non-inverted output signal applied to the signal electrode 11A of the Mach-Zehnder optical modulator 11 has the same phase of the low frequency as the inverted output signal applied to the signal electrode 11B of the Mach-Zehnder optical modulator 11.

It is preferable but not necessary that the non-inverted output signal applied to the signal electrode 11A has the same absolute value of the direct current voltage component as the inverted output signal applied to the signal electrode 11B, provided the non-inverted and inverted output signals have opposite polarities to each other of the direct current voltage components.

It is preferable that the non-inverted and inverted output signals include the low frequency components, provided that the non-inverted and inverted output signals have opposite polarities to each other of the direct current voltage components. It is, however, necessary that at least one of the non-inverted and inverted output signals include the low frequency component. This means it possible that one of the non-inverted and inverted output signals includes both the direct current voltage component and the low frequency component, while another of the non-inverted and inverted output signals includes the direct current voltage component only, provided the non-inverted and inverted output signals have opposite polarities to each other of the direct current voltage components. As described above, the direct current voltage component includes the stationary direct current voltage and the direct current voltage error signal.

Accordingly, the paired polarity-opposite direct current voltage error signals included in the non-inverted and inverted output signals are respectively applied to the paired signal electrodes 11A and 11B of the Mach-Zehnder optical modulator 11, so that the Mach-Zehnder optical modulator 11 receives the potential difference between the paired polarity-opposite direct current voltage error signals. This means that the effect of receiving the potential difference between the paired polarity-opposite direct current voltage error signals is substantially the same as the effect of receiving a two-times-increased direct current voltage error signal by one of the paired signal electrodes 11A and 11B or by the single signal electrode 11A. This further means that for the novel light intensity modulation system of this embodiment, either the input driving signal 70 with the full width or amplitude of "Vπ" or another input driving signal with a full width or amplitude of "2Vπ" is available. Namely, the respective applications of the paired polarity-opposite direct current voltage error signals, which are included in the non-inverted and inverted output signals, to the paired signal electrodes 11A and 11B of the Mach-Zehnder optical modulator 11 allow the novel light intensity modulation system of this embodiment to utilize either the input driving signal 70 with the full width or amplitude smaller than "2Vπ", for example, "Vπ" or the other input driving signal with the full width or amplitude equal to "2Vπ". This means that the respective applications of the paired polarity-opposite direct current voltage error signals makes the locking range wider by two times.

If the other input driving signals with the full width or amplitude of "2Vπ" are applied to the paired signal electrodes 11A and 11B of the Mach-Zehnder optical modulator 11, the Mach-Zehnder optical modulator 11 outputs the intensity-modulated optical output signal 8 which has the extinction characteristic as shown in FIG. 2.

If the other input driving signals with the full width or amplitude smaller than "2Vπ" are applied to the paired signal electrodes 11A and 11B of the Mach-Zehnder optical modulator 11, the Mach-Zehnder optical modulator 11 outputs the intensity-modulated optical output signal 8 which has the extinction characteristic as shown in FIG. 5. In this case, the input driving signal 70 has a full width or a full amplitude which is smaller than 2Vπ, or smaller than a potential difference between adjacent two of bias voltages at which the optical intensity takes the minimum value or adjacent two of other bias voltages at which the optical intensity takes the maximum value in the extinction characteristic. At the signal electrode 11A of the Mach-Zehnder optical modulator 11, the output signal including the low frequency signal from the bias supplying circuit 14 is superimposed to the input driving signal 70 in order to generate, at the signal electrode 11A, an amplitude-modulated input driving signal waveform with a pair of same-phased envelope lines 21 and 22 which define a full width or a full amplitude which is smaller than 2Vπ, or smaller than a potential difference between adjacent two of bias voltages at which the optical intensity takes the minimum value or adjacent two of other bias voltages at which the optical intensity takes the maximum value in the extinction characteristic.

The Mach-Zehnder optical modulator 11 performs an optical intensity-modulation of the inputted continuous wave light from the light source 1 based on the amplitude-modulated input driving signal waveform. The Mach-Zehnder optical modulator 11 generates an intensity-modulated optical output signal 8 which is traveled to the optical branch circuit 2. The optical branch circuit 2 divides the intensity-modulated optical output signal 8 into a first intensity-modulated optical output signal 2A as an optical transmission signal and a second intensity-modulated optical output signal 2B as an optical feed-back signal.

The second intensity-modulated light signal 2B as the optical feed-back signal is supplied to the photoelectric converter 3 and converted into an electric feed-back signal by the photoelectric converter 3. The electric feed-back signal is then supplied to the amplifier 5 and amplified by the amplifier 5. The amplified electric feed-back signal is then supplied to the phase comparator 6. The low frequency signal from the low frequency oscillation circuit 4 is also supplied to the phase comparator 6. The phase comparator 6 performs a synchronous detection by comparing the low frequency signal to the amplified electric feed-back signal, so that the phase comparator 6 generates a synchronously detected signal. The synchronously detected signal is supplied to the integrating circuit 12, so that the integrating circuit 12 performs a low pass filter function which extracts a direct current voltage error signal from the synchronously detected signal and also performs an amplification function which amplifies the extracted direct current voltage error signal. The integrating circuit 12 generates an amplified direct current voltage error signal.

The amplified direct current voltage error signal is supplied to the bias supplying circuit 14. The low frequency signal is also supplied from the low frequency oscillation circuit 4 to the bias supplying circuit 14. The bias supplying circuit 14 performs separate addition operations or separate subtraction operations of the low frequency signal and the amplified direct current voltage error signal to or from a stationary direct current voltage signal, so that the bias supplying circuit 14 generates a modified bias signal which includes the low frequency signal of a frequency "f0", and the direct current voltage error signal. The above-described paired polarity-opposite direct current voltage error signals included in the non-inverted and inverted output signals are respectively applied to the paired signal electrodes 11A and 11B of the Mach-Zehnder optical modulator 11, so that the Mach-Zehnder optical modulator 11 receives the potential difference between the paired polarity-opposite direct current voltage error signals. This means that the effect of receiving the potential difference between the paired polarity-opposite direct current voltage error signals is substantially the same as the effect of receiving a two-times-increased direct current voltage error signal by one of the paired signal electrodes 11A and 11B or by the single signal electrode 11A. This further means that for the novel light intensity modulation system of this embodiment either the input driving signal 70 with the full width or amplitude of "Vπ" or another input driving signal with a full width or amplitude of "2Vπ" is available. Namely, the respective applications of the paired polarity-opposite direct current voltage error signals, which are included in the non-inverted and inverted output signals, to the paired signal electrodes 11A and 11B of the Mach-Zehnder optical modulator 11 allow the novel light intensity modulation system of this embodiment to utilize either the input driving signal 70 with the full width or amplitude smaller than "2Vπ", for example, "Vπ" or the other input driving signal with the full width or amplitude equal to "2Vπ". This means that the respective applications of the paired polarity-opposite direct current voltage error signals makes the locking range wider by two times.

The extinction characteristic of the Mach-Zehnder optical modulator 11 may be controlled so that either the minimum value or the maximum value of the light intensity corresponds to the direct current bias voltage. In this example, the extinction characteristic is controlled so that the minimum value of the light intensity corresponds to the direct current bias voltage as shown in FIG. 5.

As described above, the paired signal electrodes 11A and 11B of the Mach-Zehnder optical modulator 11 receive the paired amplitude-modulated input driving signal waveforms with the paired same-phased envelope lines 21 and 22 which define the full width or the full amplitude which is smaller than 2Vπ, or smaller than the potential difference between adjacent two of bias voltages at which the optical intensity takes the minimum value or adjacent two of other bias voltages at which the optical intensity takes the maximum value in the extinction characteristic.

As shown in FIG. 5, the paired same-phased envelope lines 21 and 22 correspond to two sloped regions of the extinction characteristic curve between the minimum value point and the maximum value points. The two sloped regions of the extinction characteristic curve have opposite gradients to each other. The envelope line 21 corresponds to the positive gradient region of the extinction characteristic curve, while the envelope line 22 corresponds to the negative gradient region of the extinction characteristic curve. Namely, the paired same-phased envelope lines 21 and 22 are positioned corresponding to the sloped regions which are inside of the two maximum value points of the extinction characteristic curve. As compression, as shown in FIG. 2, the envelope lines of the input signal waveform of the conventional system are correspond to two adjacent maximum value points of the extinction characteristic curve of the conventional system. This difference in the positions of the paired same-phased envelope lines between the novel and conventional systems means that the novel system exhibits the intensity modulation operation quite different from the intensity modulation operation of the conventional system.

Similarly to the first embodiment, both the direction and the magnitude or amount of the variation of the operating point can be detected, so that the bias voltage level can be controlled based on the sign and the, absolute value of the direct current voltage error signal detected by the synchronous detection by the phase comparator 6, whereby the operating point can be stabilized. Namely, the minimum value point of the extinction characteristic may be taken as the stable operating point.

If the input driving signal 70 has a full width or a full amplitude which is smaller than 2Vπ, or smaller than a potential difference between adjacent two of bias voltages at which the optical intensity takes the minimum value or adjacent two of other bias voltages at which the optical intensity takes the maximum value in the extinction characteristic. At the signal electrode 11A of the Mach-Zehnder optical modulator 11, the non-inverted output signal including the low frequency signal from the bias supplying circuit 14 is superimposed to the input driving signal 70 in order to generate, at the signal electrode 11A, an amplitude-modulated input driving signal waveform with a pair of same-phased envelope lines 21 and 22 which define a full width or a full amplitude which is smaller than 2Vπ, or smaller than a potential difference between adjacent two of bias voltages at which the optical intensity takes the minimum value or adjacent two of other bias voltages at which the optical intensity takes the maximum value in the extinction characteristic. This makes it ensured or easy that the above-described novel optical modulation system is capable of controlling or suppressing an undesired variation or fluctuation of the operating point.

In general, the increase in the bit rate of the input driving signal 70 or the increase in the frequency of the amplitude-modulated input driving signal, which drives the Mach-Zehnder optical modulator 11, makes it difficult to increase the full width or amplitude of the amplitude-modulated input driving signal. In accordance with the present invention, however, the full width of the amplitude-modulated input driving signal should be smaller than 2Vπ, or smaller than the potential difference between adjacent two of bias voltages at which the optical intensity takes the minimum value or adjacent two of other bias voltages at which the optical intensity takes the maximum value in the extinction characteristic. Namely, it is unnecessary to generate the amplitude-modulated input driving signal having the large full width of 2Vπ. This makes it ensured or easy that the above-described novel optical modulation system is capable of controlling or suppressing an undesired variation or fluctuation of the operating point.

As described above, the feed-back control to the bias voltage level is made based on the direct current voltage error signal obtained by the synchronous detection, wherein an optimum feed-back coefficient can be selected so that only the minimum value point of the extinction characteristic curve is the stable operating point. Alternatively, another optimum feed-back coefficient can be selected so that only the maximum value point of the extinction characteristic curve is the stable operating point.

As possible modifications to the above embodiment, instead of the above-described case of taking the minimum value point as the stable operating point, the maximum value point of the extinction characteristic may also be taken as the stable operating point. In this case of taking the maximum value point as the stable operating point, the sign, for example, plus and minus, of the direct current voltage error signal detected by the synchronous detection is opposite to the sign of the direct current voltage error signal in the above case of taking the minimum value point as the stable operating point.

In the above-described embodiment, the Mach-Zehnder optical modulator 11 has the single signal electrode 11A along one of the symmetrically branched two center waveguides for receives the input driving signal 70 and the output signal from the bias supplying circuit 14 for the purpose of driving the Mach-Zehnder optical modulator 11 in a mono-pole driving method.

It is also possible as another modification that either a low pass filter or a band-pass filter may optionally be inserted into between the photoelectric converter 3 and the amplifier 5. The above-described respective functional elements and/or the respective functional units may be modified in configuration unless the same or necessary functions can not be obtained.

Accordingly, if the input driving signal 70 has a full width or a full amplitude which is smaller than 2Vπ, or smaller than a potential difference between adjacent two of bias voltages at which the optical intensity takes the minimum value or adjacent two of other bias voltages at which the optical intensity takes the maximum value in the extinction characteristic, then at the signal electrode 11A of the Mach-Zehnder optical modulator 11, the output signal including the low frequency signal from the bias supplying circuit 14 is superimposed to the input driving signal 70 in order to generate, at the signal electrode 11A, an amplitude-modulated input driving signal waveform with a pair of same-phased envelope lines 21 and 22 which define a full width or a full amplitude which is smaller than 2Vπ, or smaller than a potential difference between adjacent two of bias voltages at which the optical intensity takes the minimum value or adjacent two of other bias voltages at which the optical intensity takes the maximum value in the extinction characteristic. This makes it ensured or easy that the above-described novel optical modulation system is capable of controlling or suppressing an undesired variation or fluctuation of the operating point.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An optical modulation system including:
   an optical modulator generating an intensity-modulated output optical signal;
   an operating point detecting unit for receiving said intensity-modulated output optical signal from said optical modulator and detecting at least one of a direction and a magnitude of a variation of an operating point from an intended operating point, based on a low frequency signal component included in said intensity-modulated output optical signal, and said operating point detecting unit generating a direct current error signal which represents said at least one of said direction and said magnitude of said variation of said operating point from said intended operating point; and
   a signal supplying unit being functionally coupled to said operating point detecting unit for receiving said error signal and generating an output signal which includes a stationary direct current bias voltage, said direct current error signal and a low frequency signal having a first frequency;
   wherein a first signal electrode of said optical modulator is coupled to said signal supplying unit for causing that at said first signal electrode, said output signal is superimposed to an input driving signal having a second frequency higher than said first frequency, in order to generate, at said first signal electrode, an amplitude-modulated input driving signal waveform, which has a pair of same phase envelope lines, and which has a full width smaller than a potential difference between adjacent two of bias voltages at which an optical intensity of said intensity-modulated output optical signal takes a minimum value or between adjacent two of other bias voltages at which said optical intensity takes a maximum value.

2. The optical modulation system as claimed in claim 1, wherein said signal supplying unit further includes:
   a low frequency signal generator being functionally coupled to said operating point detecting unit for supplying said low frequency signal having said first frequency to said operating point detecting unit, so that said operating point detecting unit detects said at least one of said direction and said magnitude of said variation of said operating point from said intended operating point, based on both said intensity-modulated output optical signal and said low frequency signal; and
   a bias supplying circuit being functionally coupled to said low frequency signal generator for receiving said low frequency signal and superimposing said low frequency signal to a direct current voltage component which includes said stationary direct current bias voltage and said direct current error signal.

3. The optical modulation system as claimed in claim 1, wherein said operating point detecting unit detects both said direction and said magnitude of said variation of said operating point from said intended operating point, and said direct current error signal represents both said direction and said magnitude of said variation of said operating point.

4. The optical modulation system as claimed in claim 3, wherein an absolute value of said direct current error signal represents said magnitude of said variation of said operating point, and a sign of said direct current error signal represents said direction of said variation of said operating point.

5. The optical modulation system as claimed in claim 1, wherein said input driving signal has a full width smaller than a potential difference between adjacent two of bias voltages at which an optical intensity of said intensity-modulated output optical signal takes a minimum value or between adjacent two of other bias voltages at which said optical intensity takes a maximum value.

6. The optical modulation system as claimed in claim 1, wherein said optical modulator further has a second signal electrode, and said signal supplying unit further generates an additional output signal which includes a polarity-opposite direct current voltage component which has an opposite polarity to a direct current voltage component of said output signal, and said signal supplying unit further supplies said additional output signal to said second signal electrode.

7. The optical modulation system as claimed in claim 6, wherein said additional output signal includes said polarity-opposite direct current voltage component only free of said low frequency signal.

8. The optical modulation system as claimed in claim 6, wherein said additional output signal includes not only said polarity-opposite direct current voltage component but also said low frequency signal, and said additional output signal has the same phase of said low frequency component as said output signal.

9. The optical modulation system as claimed in claim 6, wherein said polarity-opposite direct current voltage component includes only a polarity-opposite direct current error signal which has an opposite polarity to said direct current error signal included in said output signal.

10. The optical modulation system as claimed in claim 6, wherein said polarity-opposite direct current voltage component included in said additional output signal has the same absolute value as said direct current voltage component included in said output signal.

11. An optical modulation system including:
   an optical modulator generating an intensity-modulated output optical signal;
   an operating point detecting unit for receiving said intensity-modulated output optical signal from said optical modulator and detecting at least one of a direction and a magnitude of a variation of an operating point from an intended operating point, based on a low frequency signal component included in said intensity-modulated output optical signal, and said operating point detecting unit generating a direct current error signal which represents said at least one of said direction and said magnitude of said variation of said operating point from said intended operating point; and
   a signal supplying unit being functionally coupled to said operating point detecting unit for receiving said error signal and generating both an output signal, which includes a direct current voltage component including said direct current error signal and a low frequency signal having a fist frequency, and an additional output signal, which includes at least a polarity-opposite direct current voltage component which is opposite in polarity to said direct current voltage component,
   wherein first and second signal electrodes of said optical modulator are coupled to said signal supplying unit for causing that at said first signal electrode, said output signal is superimposed to an input driving signal having a second frequency higher than said first frequency, in order to generate, at said first signal electrode, an amplitude-modulated input driving signal waveform, and said second signal electrode receives said additional output signal.

12. The optical modulation system as claimed in claim 11, wherein said signal supplying unit further includes:
   a low frequency signal generator being functionally coupled to said operating point detecting unit for supplying said low frequency signal having said first frequency to said operating point detecting unit, so that said operating point detecting unit detects said at least one of said direction and said magnitude of said variation of said operating point from said intended operating point, based on both said intensity-modulated output optical signal and said low frequency signal; and
   a bias supplying circuit being functionally coupled to said low frequency signal generator for receiving said low frequency signal and superimposing said low frequency signal to said direct current voltage component which includes a stationary direct current bias voltage and said direct current error signal.

13. The optical modulation system as claimed in claim 11, wherein said operating point detecting unit detects both said direction and said magnitude of said variation of said operating point from said intended operating point, and said direct current error signal represents both said direction and said magnitude of said variation of said operating point.

14. The optical modulation system as claimed in claim 13, wherein an absolute value of said direct current error signal represents said magnitude of said variation of said operating point, and a sign of said direct current error signal represents said direction of said variation of said operating point.

15. The optical modulation system as claimed in claim 11, wherein said input driving signal has a full width substantially equal to a potential difference between adjacent two of bias voltages at which an optical intensity of said intensity-modulated output optical signal takes a minimum value or between adjacent two of other bias voltages at which said optical intensity takes a maximum value.

16. The optical modulation system as claimed in claim 11, wherein said additional output signal includes said polarity-opposite direct current voltage component only free of said low frequency signal.

17. The optical modulation system as claimed in claim 11, wherein said additional output signal includes not only said polarity-opposite direct current voltage component but also said low frequency signal, and said additional output signal has the same phase of said low frequency component as said output signal.

18. The optical modulation system as claimed in claim 11, wherein said polarity-opposite direct current voltage component includes only a polarity-opposite direct current error signal which has an opposite polarity to said direct current error signal included in said output signal.

19. The optical modulation system as claimed in claim 11, wherein said polarity-opposite direct current, voltage component included in said additional output signal has the same absolute value as said direct current voltage component included in said output signal.

20. The optical modulation system as claimed in claim 11, wherein said amplitude-modulated input driving signal has a pair of same phase envelope lines, and which has a full width smaller than a potential difference between adjacent two of bias voltages at which an optical intensity of said intensity-modulated output optical signal takes a minimum value or between adjacent two of other bias voltages at which said optical intensity takes a maximum value.

21. A method of driving an optical modulator including:
   applying, to a first signal electrode of said optical modulator, an amplitude-modulated input driving signal waveform, which has a pair of same phase envelope lines, and which has a fall width smaller than a potential difference between adjacent two of bias voltages at which an optical intensity of an intensity-modulated output optical signal from said optical modulator takes a minimum value or between adjacent two of other bias voltages at which said optical intensity takes a maximum value.

22. The method as claimed in claim 21, wherein said amplitude-modulated input driving signal waveform is generated by the steps of:
   detecting at least one of a direction and a magnitude of a variation of an operating point from an intended operating point, based on a low frequency signal component included in said intensity-modulated output optical signal;
   generating a direct current error signal which represents said at least one of said direction and said magnitude of said variation of said operating point from said intended operating point; and
   generating an output signal which includes a stationary direct current bias voltage, said direct current error signal and a low frequency signal having a first frequency.

23. The method as claimed in claim 22, wherein both said direction and said magnitude of said variation of said operating point are detected from said intended operating point, and said direct current error signal represents both said direction and said magnitude of said variation of said operating point.

24. The method as claimed in claim 23, wherein an absolute value of said direct current error signal represents said magnitude of said variation of said operating point, and a sign of said direct current error signal represents said direction of said variation of said operating point.

25. The method as claimed in claim 22, wherein said input driving signal has a full width smaller than a potential difference between adjacent two of bias voltages at which an optical intensity of said intensity-modulated output optical signal takes a minimum value or between adjacent two of other bias voltages at which said optical intensity takes a maximum value.

26. The method as claimed in claim 21, further including:
generating an additional output signal which includes a polarity-opposite direct current voltage component which has an opposite polarity to a direct current voltage component of said output signal; and
supplying said additional output signal to a second signal electrode of said optical modulator.

27. The method as claimed in claim 26, wherein said additional output signal includes said polarity-opposite direct current voltage component only free of said low frequency signal.

28. The method as claimed in claim 26, wherein said additional output signal includes not only said polarity-opposite direct current voltage component but also said low frequency signal, and said additional output signal has the same phase of said low frequency component as said output signal.

29. The method as claimed in claim 26, wherein said polarity-opposite direct current voltage component includes only a polarity-opposite direct current error signal which has an opposite polarity to said direct current error signal included in said output signal.

30. The method as claimed in claim 26, wherein said polarity-opposite direct current voltage component included in said additional output signal has the same absolute value as said direct current voltage component included in said output signal.

31. A method for driving an optical modulator including:
applying, to a first signal electrode of said optical modulator, an amplitude-modulated input driving signal waveform obtained by superimposing an input driving signal with an output signal, which includes a direct current voltage component including a direct current error signal and a low frequency signal having a first frequency; and
applying, to a second signal electrode of said optical modulator, an additional output signal, which includes at least a polarity-opposite direct current voltage component which is opposite in polarity to said direct current voltage component.

32. The method as claimed in claim 31, wherein said amplitude-modulated input driving signal waveform is generated by the steps of:

detecting at least one of a direction and a magnitude of a variation of an operating point from an intended operating paint, based on a low frequency signal component included in said intensity-modulated output optical signal;
generating a direct current error signal which represents said at least one of said direction and said magnitude of said variation of said operating point from said intended operating point; and
generating an output signal which includes a stationary direct current bias voltage, said direct current error signal and a low frequency signal having a first frequency.

33. The method as claimed in claim 32, wherein both said direction and said magnitude of said variation of said operating point are detected from said intended operating point, and said direct current error signal represents both said direction and said magnitude of said variation of said operating point.

34. The method as claimed in claim 33, wherein an absolute value of said direct current error signal represents said magnitude of said variation of said operating point, and a sign of said direct current error signal represents said direction of said variation of said operating point.

35. The method as claimed in claim 32, wherein said input driving signal has a full width substantially equal to a potential difference between adjacent two of bias voltages at which an optical intensity of said intensity-modulated output optical signal takes a minimum value or between adjacent two of other bias voltages at which said optical intensity takes a maximum value.

36. The method as claimed in claim 32, wherein said input driving signal has a full width smaller than a potential difference between adjacent two of bias voltages at which an optical intensity of said intensity-modulated output optical signal takes a minimum value or between adjacent two of other bias voltages at which said optical intensity takes a maximum value.

37. The method as claimed in claim 31, wherein said additional output signal includes said polarity-opposite direct current voltage component only free of said low frequency signal.

38. The method as claimed in claim 31, wherein said additional output signal includes not only said polarity-opposite direct current voltage component but also said low frequency signal, and said additional output signal has the same phase of said low frequency component as said output signal.

39. The method as claimed in claim 31, wherein said polarity-opposite direct current voltage component includes only a polarity-opposite direct current error signal which has an opposite polarity to said direct current error signal included in said output signal.

40. The method as claimed in claim 31, wherein said polarity-opposite direct current voltage component included in said additional output signal has the same absolute value as said direct current voltage component included in said output signal.

* * * * *